United States Patent [19]
Goren et al.

[11] Patent Number: 5,734,152
[45] Date of Patent: Mar. 31, 1998

[54] OPTICAL SCANNERS AND SIGNAL PROCESSORS THEREFOR

[75] Inventors: David Goren, Ronkonkoma; Stephen Shellhammer, Lake Grove; Harry Kuchenbrod, Kings Park; Donna Pandolfo, Ronlonkoma; Gary Serbin, Bellmore; Guy Cipriani, Central Islip; Edward Barkan, Miller Place, all of N.Y.

[73] Assignee: Symbol Technologies, Inc., Holtsville, N.Y.

[21] Appl. No.: 454,830

[22] Filed: May 31, 1995

[51] Int. Cl.⁶ .................................................. G06K 7/10
[52] U.S. Cl. .......................... 235/462; 235/463; 235/472
[58] Field of Search ................................. 235/463, 462, 235/472

[56] References Cited

U.S. PATENT DOCUMENTS

| | | | |
|---|---|---|---|
| 3,796,862 | 3/1974 | Asija | 235/462 |
| 3,798,458 | 3/1974 | Buckingham et al. | 235/463 |
| 3,892,949 | 7/1975 | Dodson, III | 235/462 |
| 3,932,840 | 1/1976 | Hanchett | 235/463 |
| 4,160,156 | 7/1979 | Sherer | 235/463 |
| 4,184,179 | 1/1980 | Demig | 235/463 |
| 4,251,798 | 2/1981 | Swartz et al. | |
| 4,354,101 | 10/1982 | Hester et al. | 235/463 |
| 4,360,798 | 11/1982 | Swartz et al. | |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,460,120 | 7/1984 | Shepard et al. | 235/472 |
| 4,496,831 | 1/1985 | Swartz et al. | 235/472 |
| 4,500,776 | 2/1985 | Laser | 235/162 |
| 4,740,675 | 4/1988 | Brosnan et al. | 235/462 |
| 4,746,789 | 5/1988 | Gieles et al. | 235/463 |
| 4,758,717 | 7/1988 | Shepard et al. | 235/472 |
| 4,760,248 | 7/1988 | Swartz et al. | 235/472 |
| 4,782,220 | 11/1988 | Shuren | 235/463 |
| 4,798,943 | 1/1989 | Cherry | 235/463 |
| 4,808,804 | 2/1989 | Krichever et al. | 235/462 |
| 4,855,581 | 8/1989 | Mertel et al. | 235/462 |
| 4,859,840 | 8/1989 | Hasegawa et al. | 235/463 |

(List continued on next page.)

FOREIGN PATENT DOCUMENTS 0 036 950  10/1981  European Pat. Off. .

OTHER PUBLICATIONS

Ehrich et al., "Representation of Random Waveforms by Relational Trees," IEEE Transactions on Computers, vol. C–25, No. 7, pp. 725–736 (Jul. 1976).

Eklundh et al., "Peak Detection Using Difference Operators," IEEE Transactions on Pattern Analysis and Machine Intelligence, vol. PAMI–1, No. 3, PP. 317–325 (Jul. 1979).

(List continued on next page.)

*Primary Examiner*—Harold Pitts
*Attorney, Agent, or Firm*—Fish & Richardson P.C.

[57] ABSTRACT

An optical scanning system is provided for producing a signal representative of a spatial distribution of indicia having different degrees of reflectivity to light, such as a bar code. The system includes an optical scanner for scanning beam of light over the spatial distribution of indicia and for producing an electrical signal corresponding to changes in the degree of reflectivity of the indicia. A digitizer, responsive to detections in a predetermined characteristic of the produced electrical signal is provided. The digitizer converts the detections into digital words, such digital signals having a plurality of bits. The digitizer includes a timing generation circuit for producing a pulse in response to each one of the detections with a time duration representative of the degree of reflectivity of the indicia as the beam of light. A decoder converts the time duration of the pulse into the digital word having a plurality of bits. An enhancement filter is also disclosed. The enhancement filter modifies pulses produced by a differentiator circuit used in the scanner. Such modification includes increasing the rise time, and peak level of, the pulses produced by the differentiator circuit 24.

18 Claims, 19 Drawing Sheets

U.S. PATENT DOCUMENTS

| | | | |
|---|---|---|---|
| 4,896,026 | 1/1990 | Krichever et al. | 235/472 |
| 4,933,538 | 6/1990 | Heiman et al. | 235/462 |
| 4,973,829 | 11/1990 | Ishida et al. | 235/462 |
| 5,010,242 | 4/1991 | Frontino | 235/467 |
| 5,029,183 | 7/1991 | Tymes | 375/1 |
| 5,036,183 | 7/1991 | Ouchi et al. | 235/462 |
| 5,059,773 | 10/1991 | Shimizu et al. | 235/436 |
| 5,073,954 | 12/1991 | Van Tyne et al. | 382/18 |
| 5,128,527 | 7/1992 | Kawai et al. | 235/462 |
| 5,140,146 | 8/1992 | Metlitsky et al. | 235/462 |
| 5,302,813 | 4/1994 | Goren | 235/462 |
| 5,457,309 | 10/1995 | Pelton | 235/462 |

OTHER PUBLICATIONS

Horowitz, "A Syntactic Algorithm for Peak Detection in Waveforms with Applications to Cardiography," Communications of the ACM, vol. 18, No. 5 (May 1975).

Kiryati et al., "Gray Levels Can Improve the Performance of Binary Image Digitizer," CVGIP: Graphical Models and Image Processing, vol. 53, No. 1, pp. 31–39 (Jan. 1991).

Pavlidis, "Algorithms for Shape Analysis of Contours and Waveforms," IEEE Transactions on Pattern Analysis and Machine Intelligence, vol. PAMI-2, No. 4, pp. 301–312 (Jul. 1980).

Pavlidis et al., "Fundamentals of Bar Code Information Theory," Computer, pp. 74–86 (Apr. 1990).

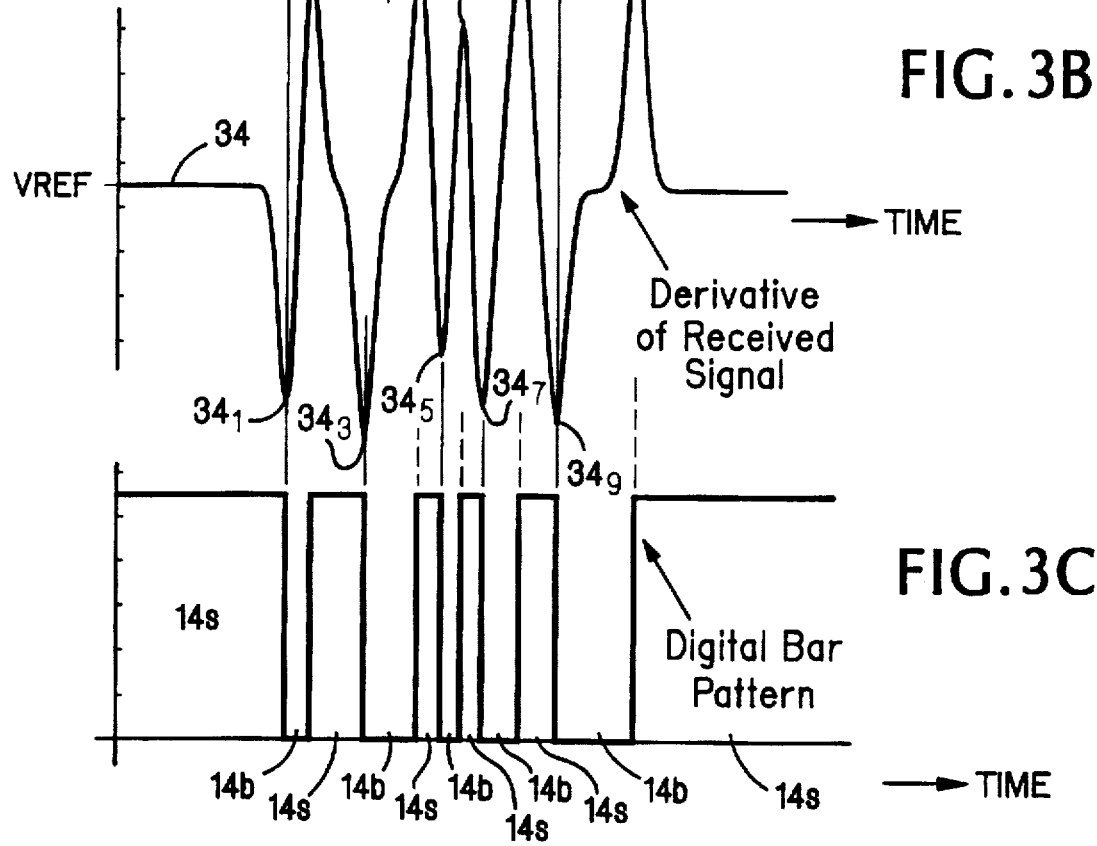

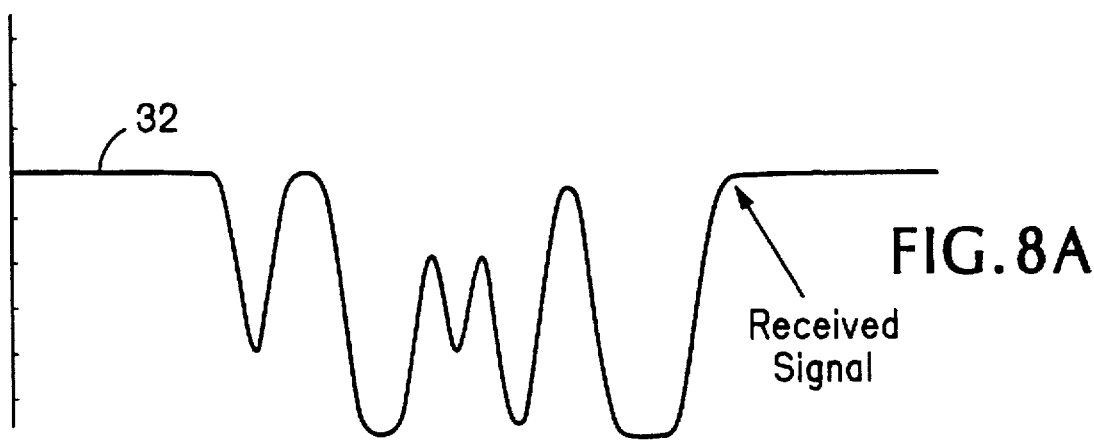
FIG. 8A Received Signal
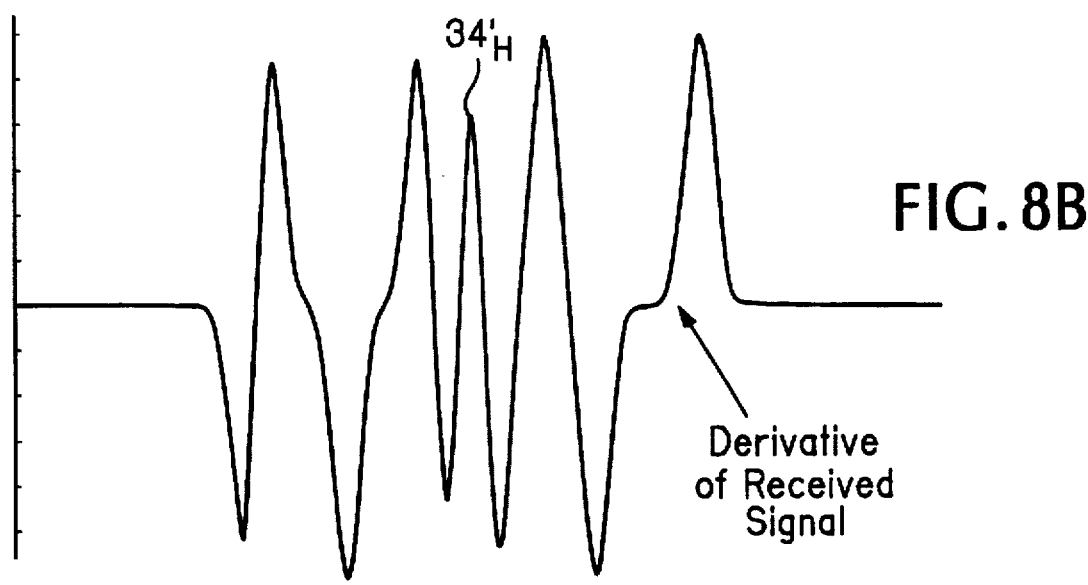
FIG. 8B Derivative of Received Signal
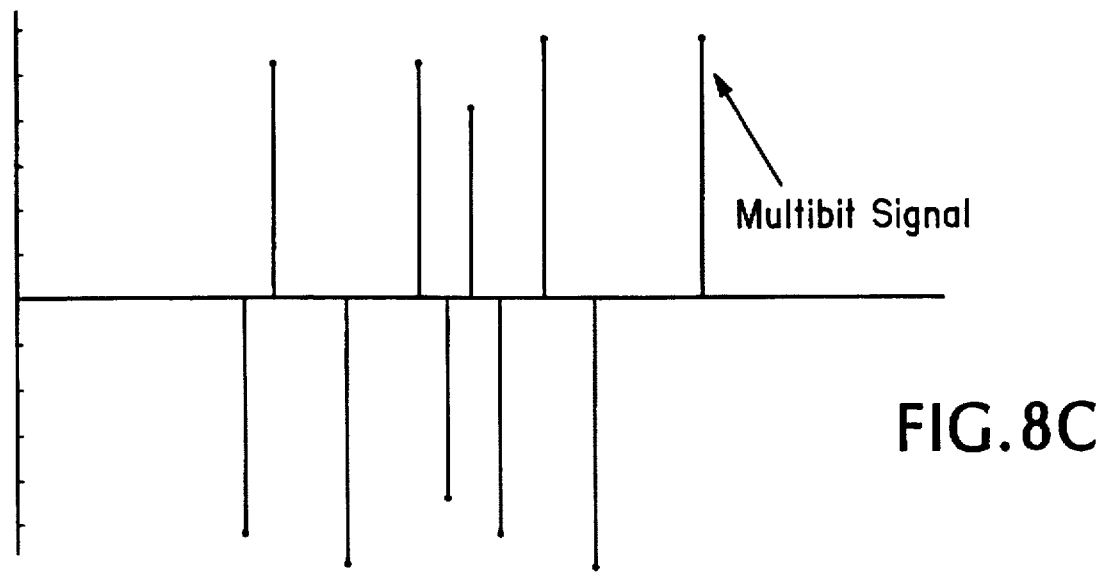
FIG. 8C Multibit Signal Received Signal Derivative of Received Signal Multibit Signal

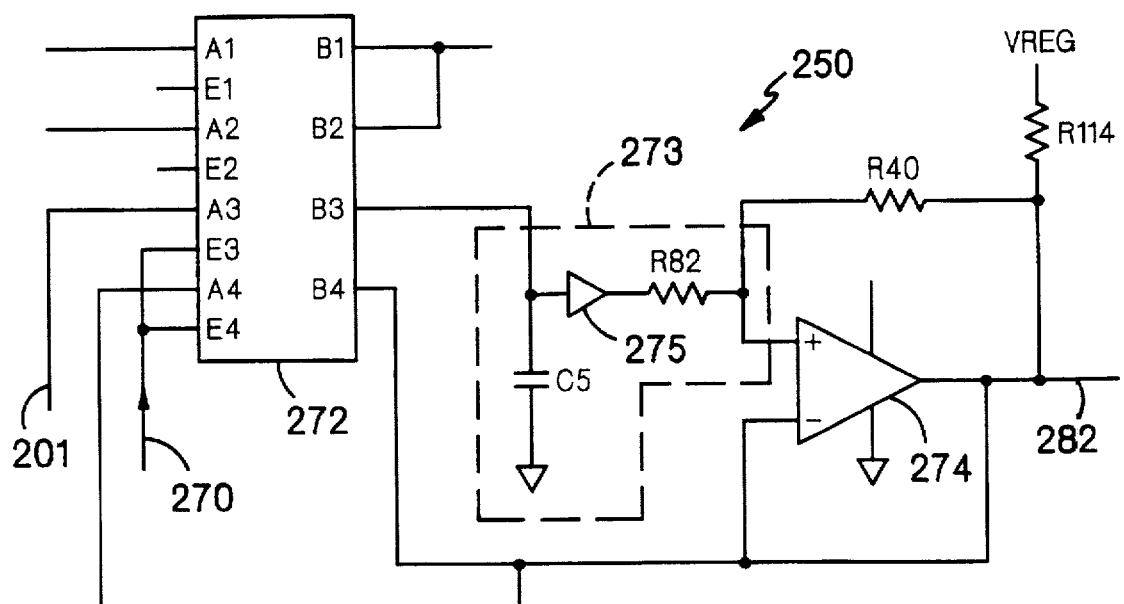
FIG. 17
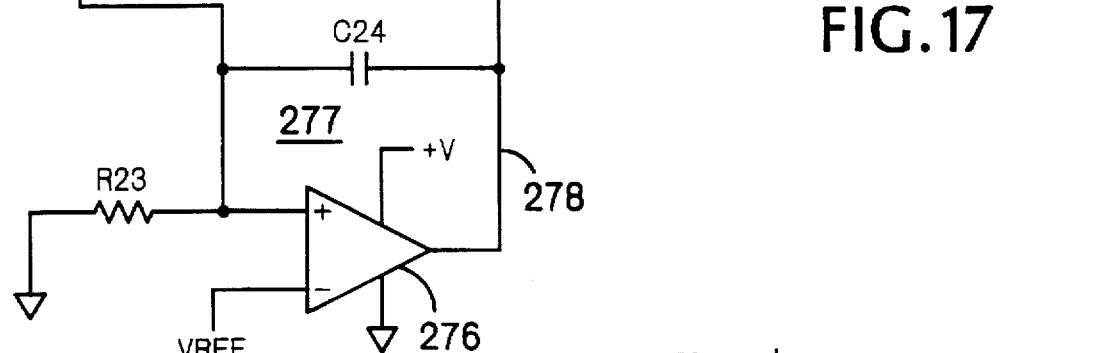
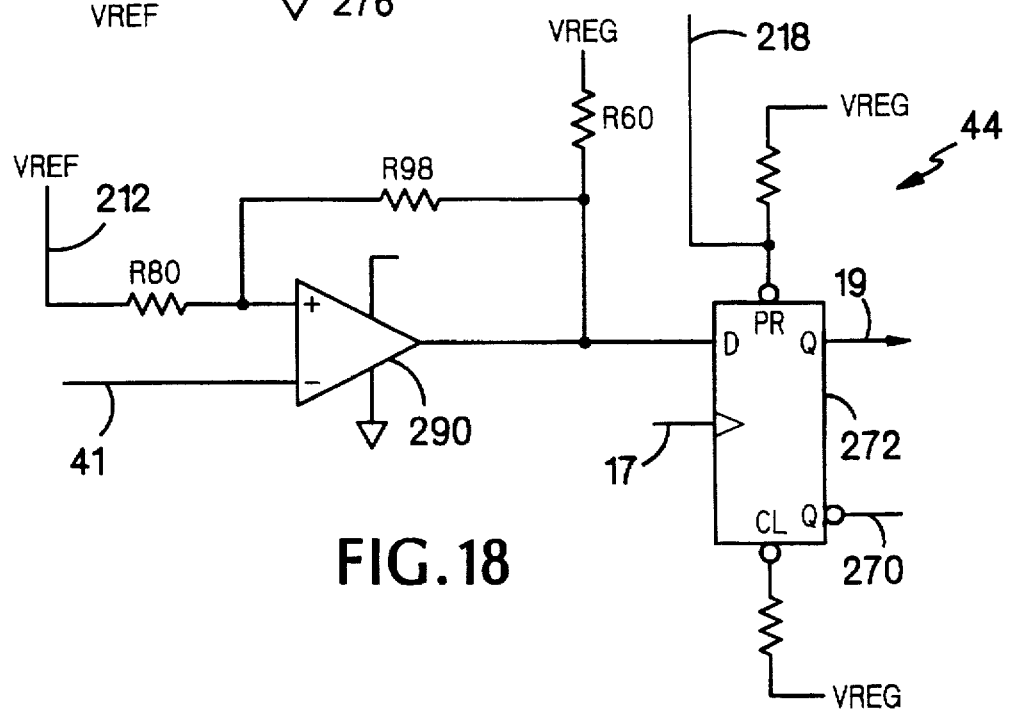
FIG. 18

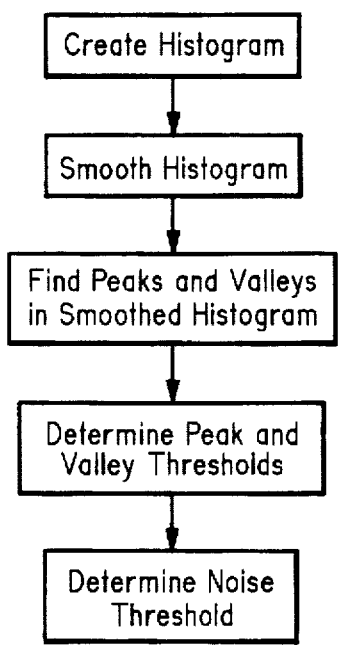
FIG. 23
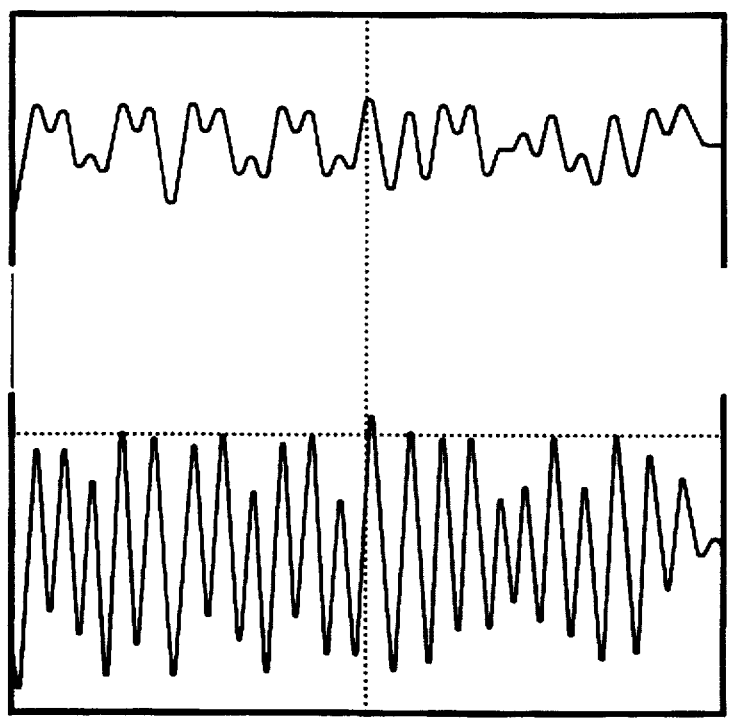
FIG. 24
FIG. 25

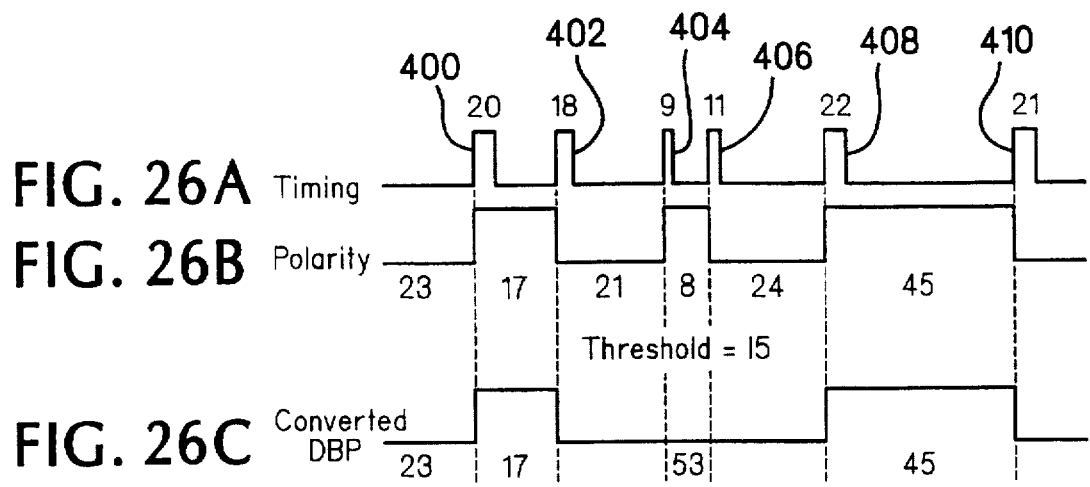
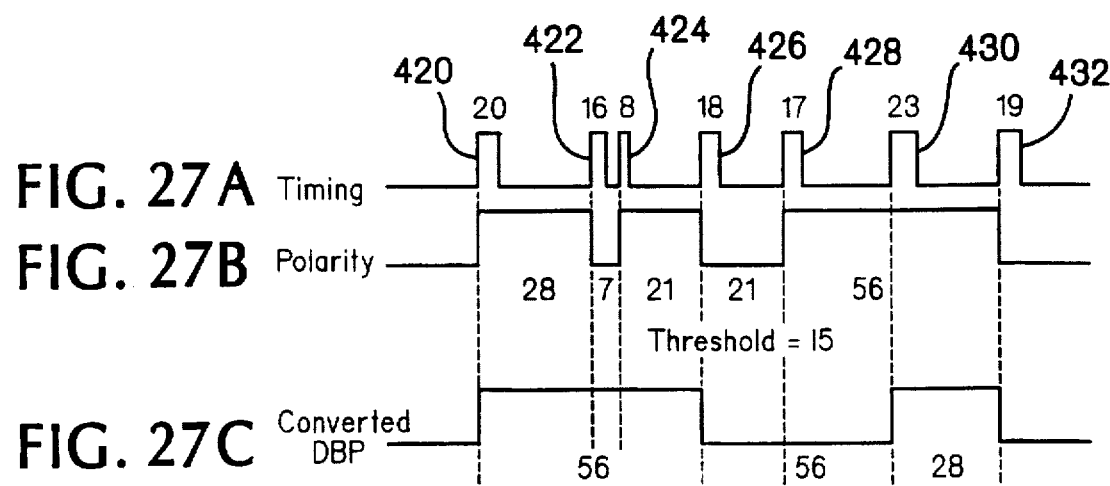

OPTICAL SCANNERS AND SIGNAL PROCESSORS THEREFOR

CROSS REFERENCE TO RELATED APPLICATIONS

This application relates to: copending U.S. patent application Ser. No. 08/347,597 filed Nov. 30, 1994 which is a continuation of Ser. No. 08/153,638 filed Nov. 17, 1993; a patent application filed concurrently herewith entitled "Method of Scanning Indicia Using Selective Sampling", inventors David Goren, Raj Bridgelall, and Edward Barkin; copending U.S. patent application Ser. No. 08/335,001 filed Nov. 9, 1994; and, U.S. Pat. No. 5,302,813 issued Apr. 12, 1994 which related to U.S. patent application filed Apr. 4, 1992 all assigned to the same assignee as the present invention, the subject matter all of which is incorporated herein by reference, the benefit of the filing dates of one, or more, of such patent applications being claimed herein to the fullest extent allowed under the provisions of 35 U.S.C. 120.

BACKGROUND OF THE INVENTION

This invention relates to optical scanners and signal processors used therein and more particularly to bar code scanners having multi-bit digitizers used to detect a pattern of optically reflective/non reflective white space/black bar indicia and provide multi-bit digital signal representations of such indicia.

As is known in the art, optical scanners and signal processors used therein, have a wide range of applications. One such application is in reading bar codes provided on products. Such optical scanners are generally referred to as bar code scanners. Signals produced by the scanners are typically fed to computing apparatus for decoding and thereby provide an identification of the product to which the bar code is applied. Examples are found in almost every supermarket, convenience store, department store, etc., as well as in warehouses and factories which use such bar code scanners for inventory and production control.

SUMMARY OF THE INVENTION

In accordance with the present invention, an optical scanning system is provided for producing a signal representative of a spatial distribution of indicia having different degrees of reflectivity to light, such as a bar code. The system includes an optical scanner for scanning beam of light over the spatial distribution of white space/black bar indicia and for producing an electrical signal corresponding to changes in the degree of reflectivity of the indicia. A digitizer, responsive to detections of a predetermined characteristic of the produced electrical signal is provided; preferably the predetermined characteristic is the strength of the edge region between a space and a bar as measured by the magnitude of the first derivative of the produced electrical signal. The digitizer converts the detections into digital words, such digital signals having a plurality of bits. Thus, preferably the digital words are related to the strength of the edge region between a space and a bar.

In a preferred embodiment, the digitizer includes a timing generation circuit for producing a timing pulse signal in response to each one of the detections with a time duration representative of the degree of reflectivity of the indicia as the beam of light. Thus, preferably the time durations of each timing pulse signal is related to the strength of an edge between a white space and a black bar. A decoder converts the time duration of the timing pulse signal into the digital word having a plurality of bits. The decoder also produces a polarity signal. The polarity signal is a bi-level (i.e., logic signal) indicating the "polarity" of the edge region producing the timing pulse signal. Here, for example, a positive edge (i.e., the polarity signal changes from a logic 0 to a logic 1) indicates a transition from a bar to a white space while a negative edge (i.e., the polarity signal changes from a logic 1 to a logic 0) indicates a transition from a white space to a bar.

With such an arrangement, the requirement of relatively expensive parallel analog to digital converts is removed. Further, the interface between the digitizer and the decoder requires fewer lines.

BRIEF DESCRIPTION OF THE DRAWING

FIGS. 3A, 3B are time histories of signals produced by the scanner of FIG. 1; FIG. 3A showing an output signal produced by a detector used in the scanner; FIG. 3B showing the output signal produced by a differentiator circuit used to differentiate the signal produced by the detector and shown in FIG. 3A; and FIG. 3C shows the bar code pattern scanned by the scanner to produce the signals in FIGS. 3A and 3B;

FIGS. 8A and 8B are timing histories of signals produced by the scanner of FIG. 1 prior to passing through the enhancement filter of FIG. 7; and FIG. 8C shows the peaks in the signals produced in FIG. 8B;

FIG. 17 is a schematic diagram of a logic circuit used in the timing control logic circuit of FIG. 16;

FIG. 18 is a schematic diagram of a polarity generation circuit used in the multi-bit digitizer of FIG. 2;

FIG. 23 is a flow diagram used by the decoder in determining the noise threshold level;

FIG. 24 is a diagram showing the time history of signals produce by a light detection section of the scanner of FIG. 1, without the enhancement filter of FIG. 7; and, FIG. 25 is a diagram showing the time history of the signals in FIG. 24 after passing through the enhancement filter of FIG. 7.

FIG. 26A is an exemplary timing history of timing pulse signals produced with the scanner of FIG. 1; FIG. 26B is a timing history of polarity signals associated with the exemplary timing pulse signals in FIG. 26B; and FIG. 26C is a timing history of the conversion of the timing pulse signals and polarity signals of FIGS. 26A and 26B.

FIG. 27A is another exemplary timing history of timing pulse signals produced with the scanner of FIG. 1; FIG. 27B is a timing history of polarity signals associated with the exemplary timing pulse signals in FIG. 27B; and FIG. 27C is a timing history of the conversion of the timing pulse signals and polarity signals of FIGS. 27A and 27B.

DESCRIPTION OF THE PREFERRED EMBODIMENTS

Figure 1A:
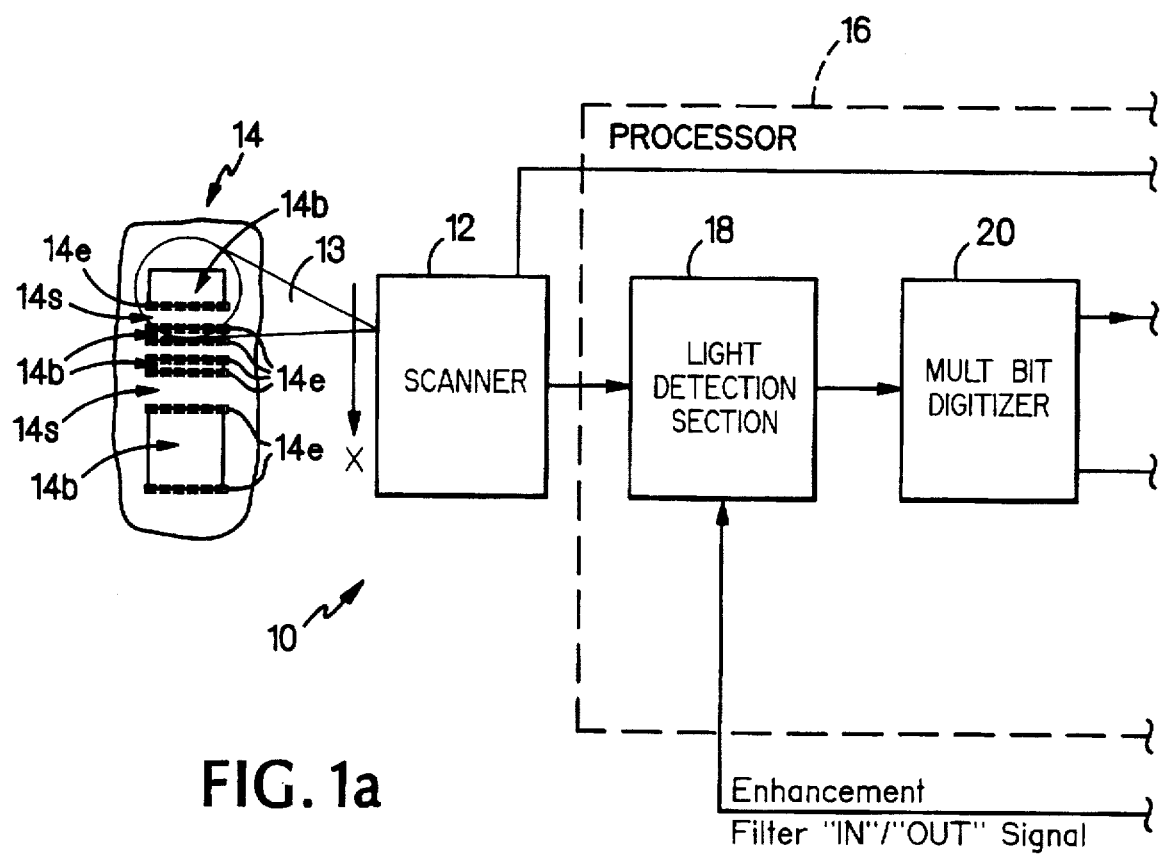
FIG. 1 (consisting of FIGS. 1a and 1b) is a block diagram of a bar code scanner according to the invention.
Figure 1B:
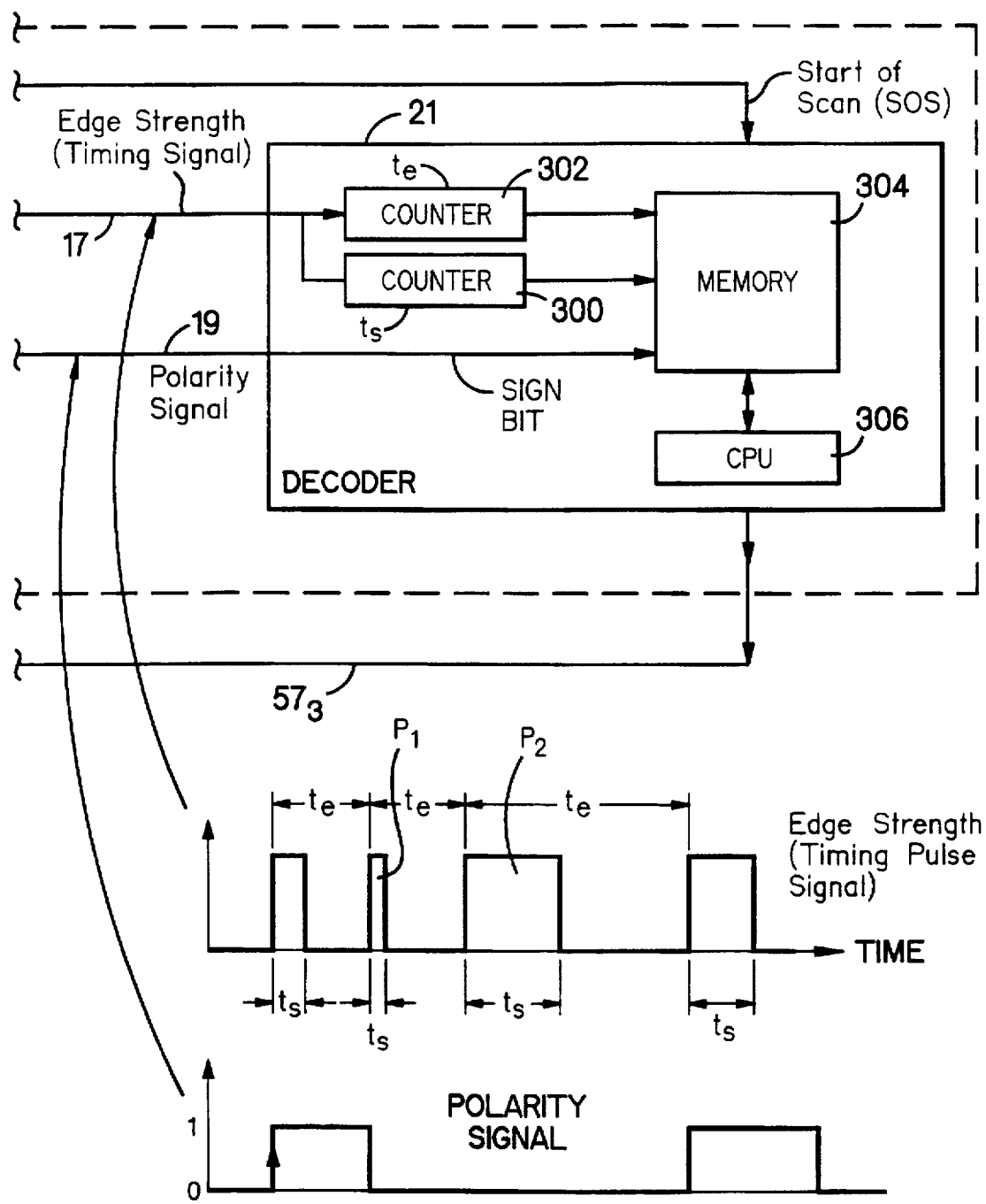

Referring now to FIG. 1, a bar code scanner 10 is shown. The bar code scanner 10 includes a scanner 12 for scanning a beam of laser light 13 across a bar code 14. The bar code 14 comprising a series of interleaved, or alternating black bars 14b and white spaces 14s, each bar 14b and space 14s having a juxtaposed edge region 14e therebetween. The bar code scanner 10 also includes a processor 16 having a light detection section 18 and a multi-bit digitizer 20 for producing a series of edge strength, or timing, pulse signals on output line 17. Each one of the timing pulse signals has a time duration, $t_e$, related to reflectivity characteristics of a corresponding one of the edge regions 14e. Here, the time duration, $t_e$, of each of the timing pulse signals on line 17 is proportional to the magnitude of the edge strength as measured by the first derivative of the analog signal produced by the light detection section 18 in response to refections of the laser light across through an edge region 14e. The multi-bit digitizer 20 also produces a polarity signal on output line 19. The polarity signal is a logic signal having a logic state indicative of whether the edge strength pulse produced concurrently therewith is a bar 14b to space 14s edge transitions or, alternatively, a space to bar edge transition. Here, for example, a positive edge (i.e., the polarity signal changes from a logic 0 to a logic 1) indicates a transition from a bar 14b to a space 14s while a negative edge (i.e., the polarity signal changes from a logic 1 to a logic 0) indicates a transition from a space 14s to a bar 14b. The time duration,$t_e$, between leading edges of the timing pulse signals is a measure of the edge to edge time duration of a bar 14b or a space 14s.

A decoder 21 is provided for decoding the timing pulse and polarity signals on lines 17, 19 into corresponding multi-bit digital words.

Figure 2A:
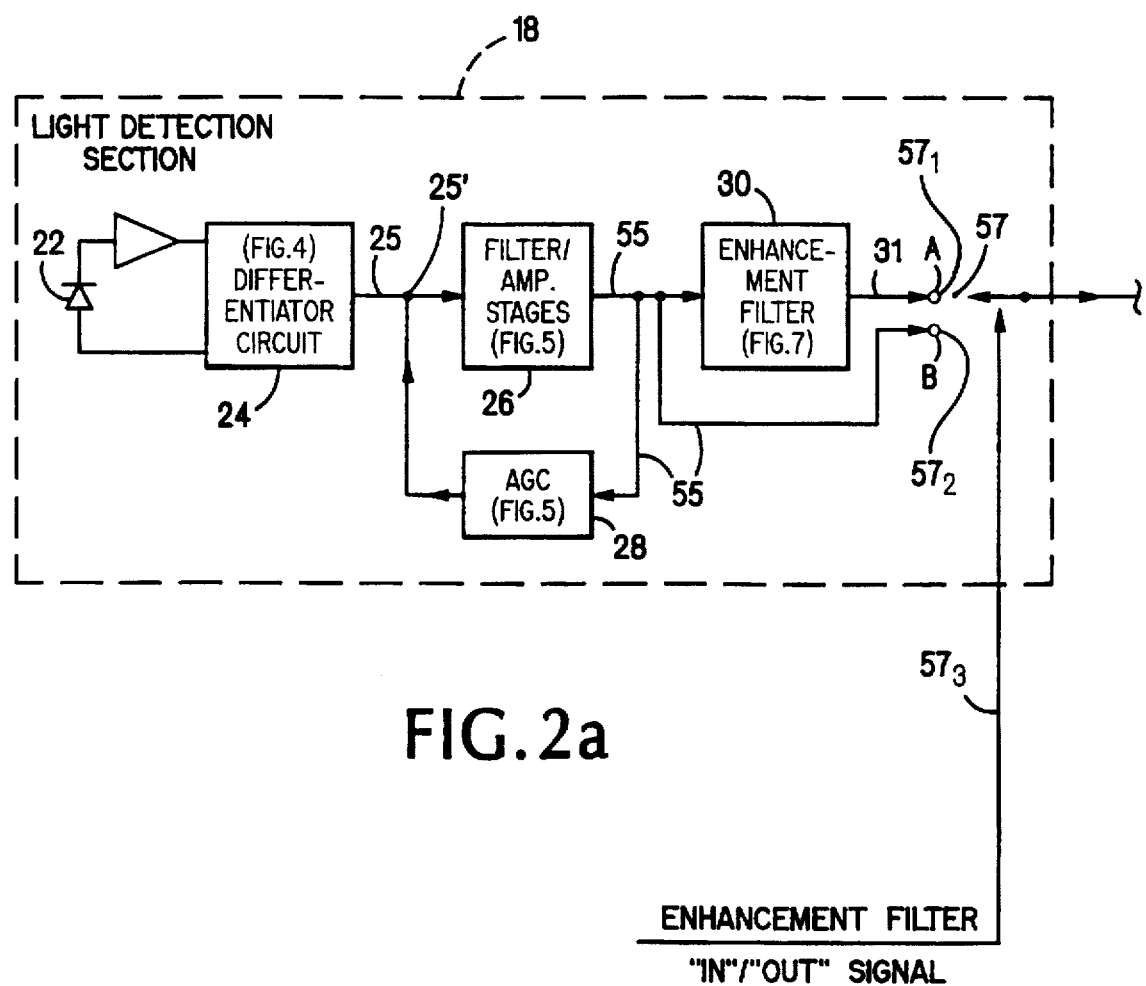
FIG. 2 (consisting of FIGS. 2a and 2b) is a block diagram of a light detection section and multi-bit digitizer used in a processor of the bar code scanner of FIG. 1.
Figure 2B:
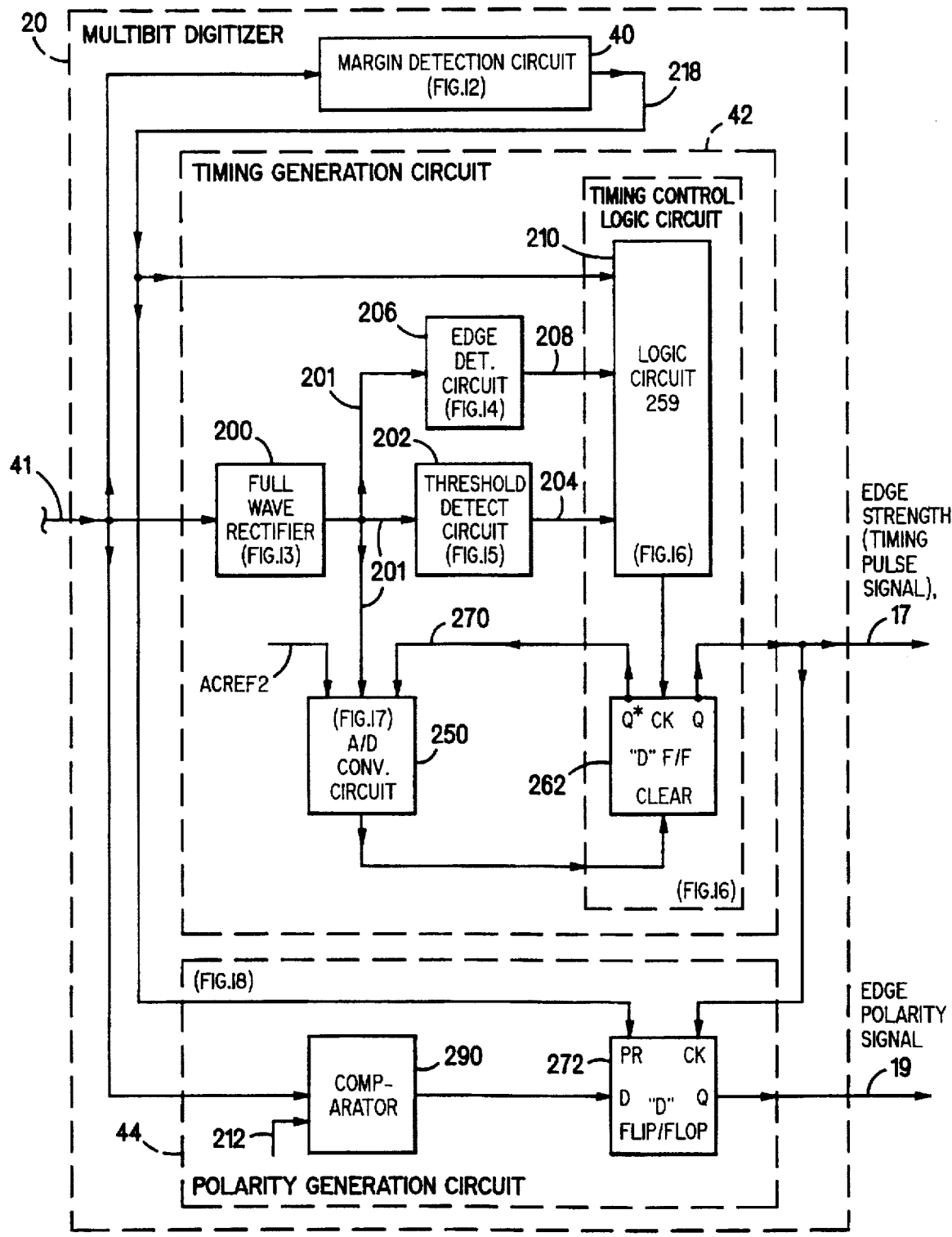

Referring also to FIG. 2, the light detection section 18 includes a detector 22, a differentiator circuit 24, a filter/amplifier stage 26, an automatic gain control (AGC) section 28, and an enhancement filter 30, arranged as shown. The detector 22 produces an electrical signal having an amplitude which varies in accordance with the bar code 14 as the beam of light 13 is scanned over the bar code 14. More, particularly, the detector 22 produces an electrical signal 32 (FIG. 3A) having an amplitude which varies in accordance with the reflectivity of the light 13 from the bar code 14 as scanner 12 scans the laser produced beam of light 13 across the bar code 14, the pattern scanned being shown in FIG. 3C. The electrical signal 32 amplitude alternates between higher levels $32H_1$, $32H_2$, $32H_3$, $32H_4$, $32H_5$, and $32H_6$ and lower levels $32L_1$, $32L_2$, $32L_3$, $32L_4$, and $32L_5$, in response to the beam of light being scanned across the edge regions 14e.

The differentiator circuit 24 produces an electrical signal 34 on line 25 (FIG. 3B) having an amplitude which varies in accordance with time rates of change in the variations in the amplitude of the detector produced electrical signal 32. Thus, the differentiator circuit 24 produces a pulse $34_1$–$34_{10}$ each time the electrical signal changes between the higher and lower levels $32H_1$–$34H_6$, $34L_1$–$34L_5$ (i.e., $32H_1$–$32L_1$, $32L_1$–$32H_2$, $32H_2$–$32L_2$, $32L_2$–$32H_3$ . . . , $32L_5$–$32H_6$), respectively, as shown. The electrical signal 34 produced by the differentiator circuit 24 is a bipolar signal; that is, negative polarity pulses $34_1$, $34_3$, $34_5$, $34_7$, $34_9$ are produced when the electrical signal 32 goes from a high level to a lower level and positive polarity pulses are produced when the electrical signal 32 goes from a lower level to a higher level, as shown. (It is noted that "positive" and negative" are relative to a reference potential, here VREF, as will be described in more detail hereinafter).

The electrical signal 34 produced by the differentiator circuit 24 is fed, via line 25 to a terminal 25'. Also fed to terminal 25' is the output of AGC circuit 28. The output of terminal 25' is to the filter/amplifier stage 26. The output on filter/amplifier stage 26 is fed, via line 55 to: the input of AGC circuit 28; the input of enhancement filter 30; and, terminal B of switch 75, as shown. The enhancement filter 30 modifies the pulses $34_1$–$34_{10}$ produced by the differentiator circuit 24; i.e. from signals such as those shown in FIG. 24 to those as shown in FIG. 25. Such modification includes increasing the rise time, and peak level of, the pulses $34_1$–$34_{10}$ produced by the differentiator circuit 24. The output of the enhancement filter is fed to a second input $57_2$ of switch 57. The output of switch 57, i.e., line 41, is coupled to either: the output of the enhancement filter 30, as when line 41 is coupled to the input $57_1$ of switch 57 (i.e., switch 57 position A); or, on the other hand directly to the output of the filter/amplifier stages 26 as when line 41 is coupled to input $57_2$ of switch 57 (i.e., switch position B). A signal on line $57_3$ from decoder 21 is used to control the A, B switch position of switch 57. When in position A the enhancement filter 30 is used (i.e., "in") and when in position B the enhancement filer 30 is not used (i.e., "out"). Here, the decoder 21 places the enhancement filter "in" every N scans, where N is a pre-selected integer, here, for example 3.

The peak levels of the modified pulses $34'_1$–$34'_{10}$, in the case when the enhancement filter 30 is "in"; or, the pulses $34_1$–$34_{10}$, in the case when the enhancement filter 30 is "out" are converted, in either case, into the edge strength pulses by the multi-bit digitizer 20, in a manner to be described in detail hereinafter. Suffice it to say here, however, that multi-bit digitizer 20 includes a threshold level detector 202 (FIGS. 2 and 15) for rejecting modified pulses $34'_1$–$34'_{10}$ having peak levels below a threshold level and for converting only non-rejected modified pulses $34'_1$–$34'_{10}$ into the edge strength (i.e., timing) pulse signals and polarity signals on lines 17, 19 respectively. Further, as will be described, each one of the converted edge strength timing pulse signals on line 17 has a time duration related to reflectivity characteristics of a corresponding one of the edge regions 14e (here the peak level of the converted, modified pulses 34'). The decoder 21 converts the edge strength timing pulse signals on line 17 into a timing signal and using a counter, not shown, to measure the time duration of the edge strength timing pulse signals produced on line 17.

More particularly, the multi-bit digitizer 20 (FIG. 2) includes a margin detection circuit 40, a timing generation circuit 42, and a polarity generation circuit 44, all arranged as shown. The margin detector circuit 40 (FIG. 4) is responsive to the signals produced on line 41 and detects the presence of a bar code 14 (FIG. 1). The timing generation circuit 42 is responsive to the margin detection circuit 40, and the signals produced on line 41, and produces the series of edge strength timing pulse signals on output line 17. The polarity circuit 44 is responsive to the signals produced on line 41, and the margin detection circuit 40, and produces, on line 19, a series of logic signals having logic states related to the whether the edge strength pulse is from a bar to space edge transition or, alternatively, from a space to bar edge transition, respectively, of the scanned bar code 14. The width of the edge strength timing pulse signals on line 17 provide the absolute value of the strength of the edges. The time from rising edge of one edge strength pulse to the rising edge of the next edge strength pulse is the time, $t_e$, between leading edges of the timing pulse signals and is, as noted above, a measure of the edge to edge time duration of a bar 14b or a space 14s. And the value (i.e., logic state) of the polarity signal on line 19 at the rising edge of the edge strength timing pulse signals on line 17 represents the polarity of the edge (i.e., whether the edge is a bar 14b or a space 14s, a discussed above.

Figure 4:
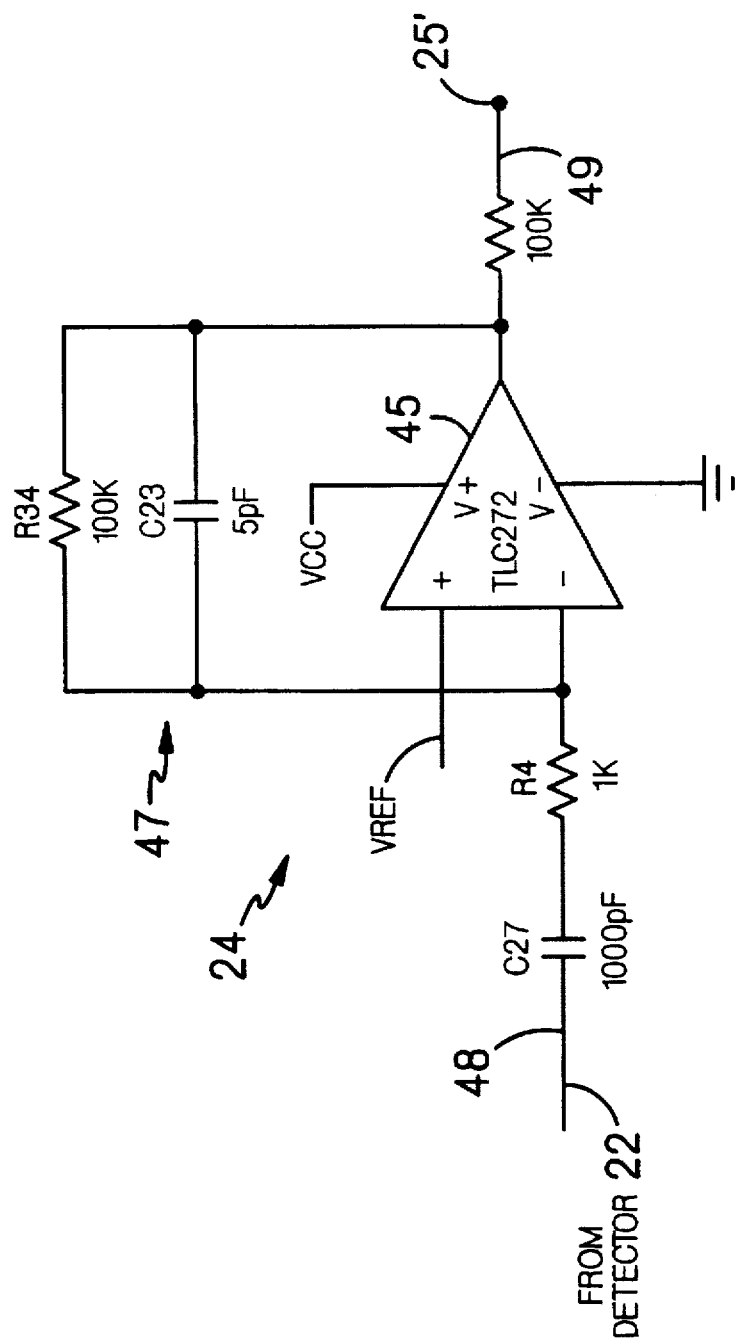
FIG. 4 is a schematic diagram of a differentiator circuit used in the light detection section of FIG. 2.

Referring now in more detail to the light detection section 18, differentiator circuit 24 is shown in detail in FIG. 4. The differentiator circuit 24 includes an operational amplifier 45 having the inverting input (−) thereof fed, via line 48, by the detector 22 through a capacitor C27, here 1000 pF, and serially connected resistor R2, here 1k ohm and the non-inverting input (+) fed by a reference potential (VREF), here nominally 1.9 volt,, as shown. (The reference voltage VREF is derived from a resistor-divider circuit (not shown) and is filtered through a parallel combination of a 2.1 microfarad electrolytic capacitor (not shown) and a 0.1 microfarad ceramic capacitor (not shown)). As noted above, the input line 48 is fed by detector 22 (FIG. 2), i.e., the signal 32 (FIG. 3A). A parallel resistor R34-capacitor C23 network 47 is connected between the output and inverting input (−) of the operational amplifier 45, as shown. Here R34 is 100 K ohms and capacitor C23 is 5 pF. The gain of the differentiator is here 40 db with poles at 318 kHz and 159 kHz. Here, the differentiator circuit 24 has a bandwidth of 40 kHz and produces analog signal levels on line 49 (i.e., signal 34, FIG. 3B) from 10 m $V_{p-p}$ to 1.6 $V_{p-p}$.

Figure 5:
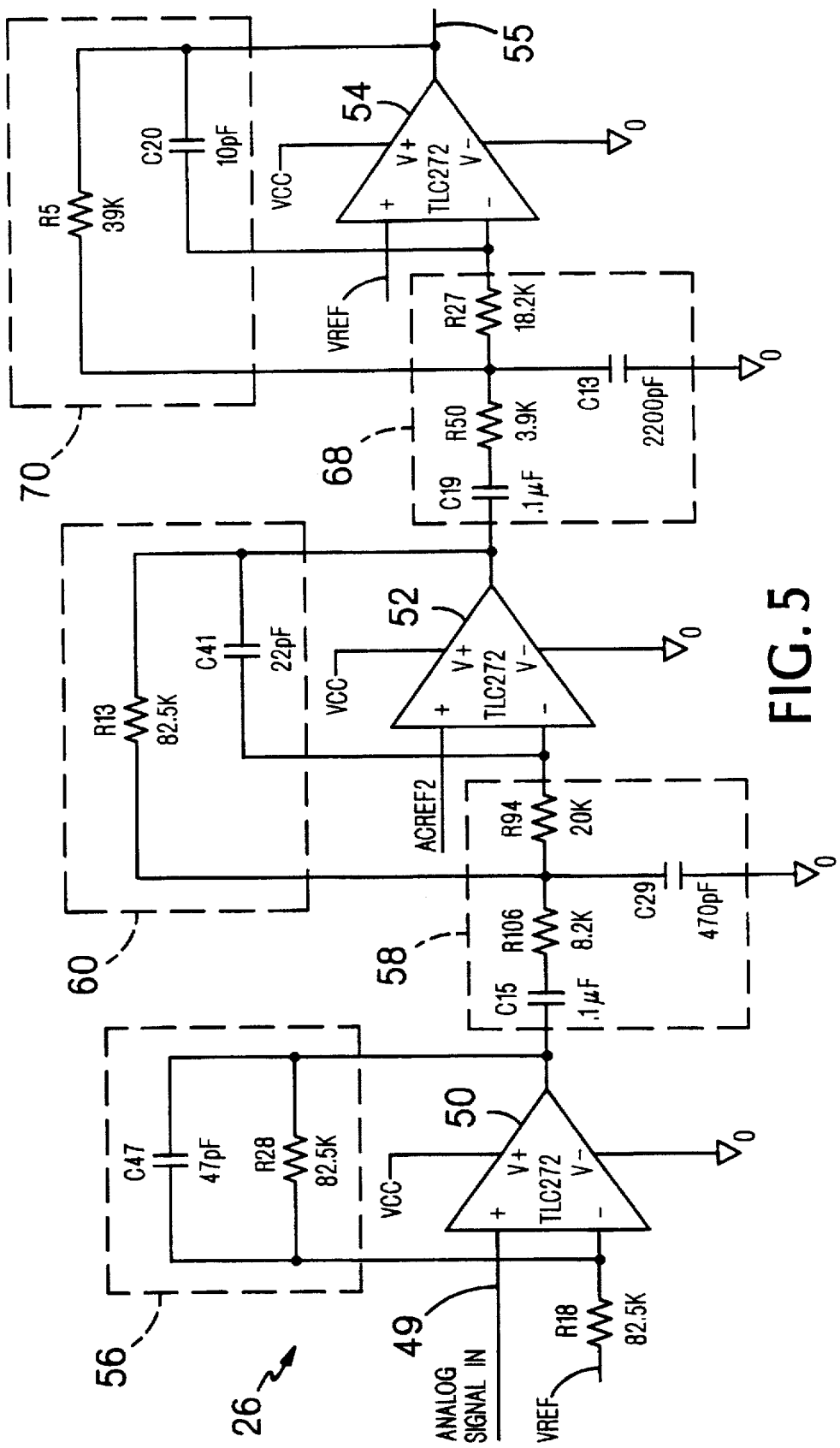
FIG. 5 is a schematic diagram of a filter/amplifier stage used in the light detection section of FIG. 2.

The filter/amplifier stage 26 is shown in FIG. 5. Here the filter/amplifier stage 26 is a five pole modified Butterworth filter and is used to provide additional signal conditioning to the differentiator circuit 24 output signal on line 49. Here, the gain through the stage 26 is 46 db. The stage 26 includes three cascaded operational amplifiers 50, 52, 54. A first amplifier 50 has the non-inverting (+) input thereof fed by the output of the differentiator circuit 24 via line 49 and the inverting (−) input fed to the 1.9 volt VREF reference potential through a, here 82.5 k ohm resistor R18, as shown. A parallel 82.5 k ohm–47 pF resistor R28-capacitor C47 network 56 is provided in a feedback loop, as shown. The intermediate amplifier 52 has the inverting input (−) thereof coupled to the output of the first amplifier 50 through an network 58 made up of resistor R106 (here 8.2 k ohms), capacitor C15 (here 0.1 microfarad), grounded capacitor C29 (here 470 pF) and resistor R94, here 20 k ohms, arranged as shown. The non-inverting input (+) is coupled to a second reference potential, VFERF, as shown. A feedback network 60 made up of resistors R13, here 82.5 k ohms, and capacitor C41 here 22 pF, is provided, as shown. The last amplifier 54 has its inverting input (−) coupled to the output of the intermediate amplifier 52 through a network 68 made up of resistor R50, here 3.9 k ohms, a capacitor C19, here 0.1 microfarad, a grounded capacitor C13, here 2200 pF and a resistor R27, here 18.2 k ohms, arranged as shown. The non-inverting input (+) is coupled to the second reference potential, VREF, as shown. A feedback network 70 made up of resistors R5, here 39 k ohms, and capacitor C20 here 10 pF, is provided, as shown.

Figure 6:
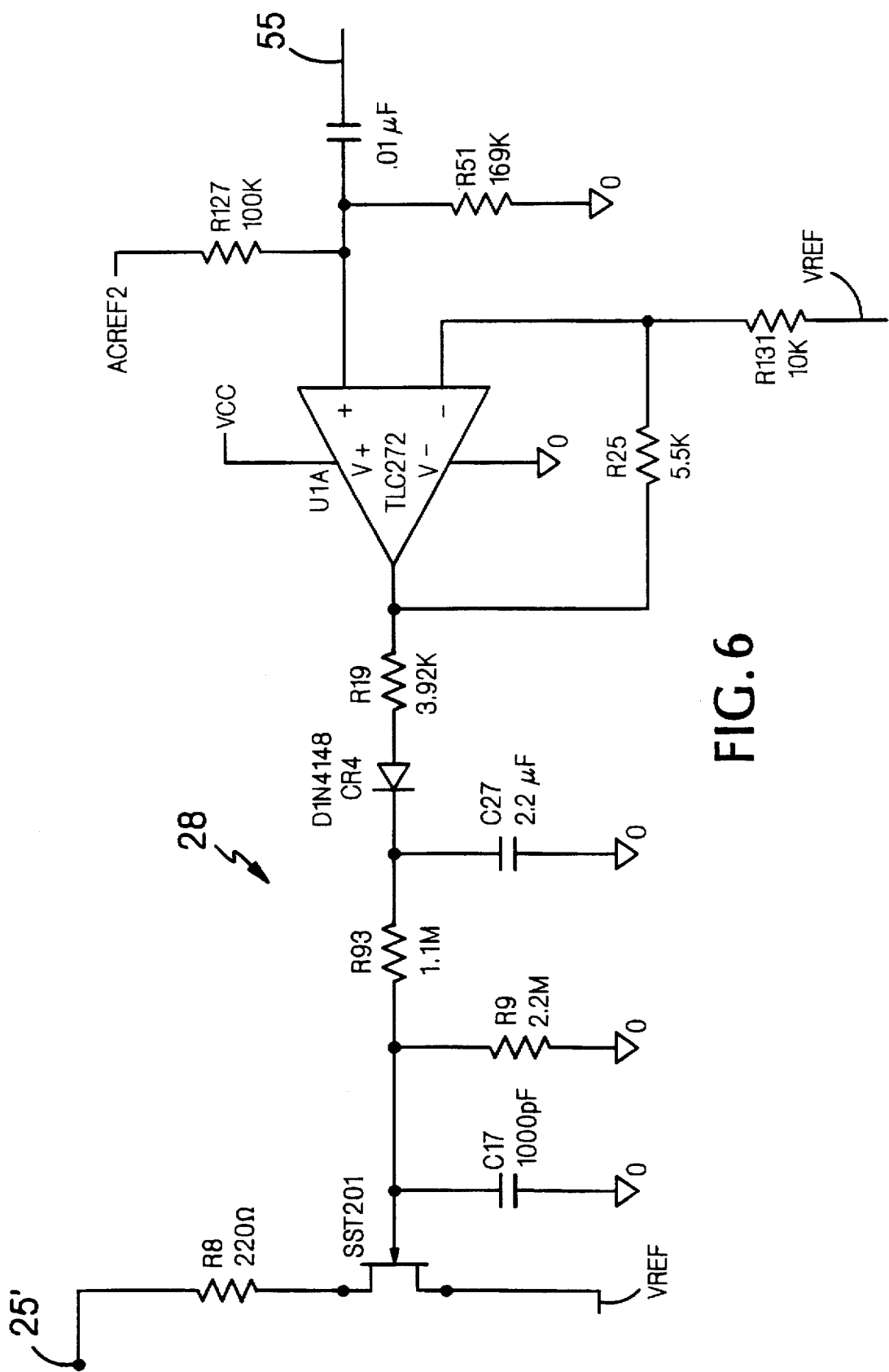
FIG. 6 is a schematic diagram of an automatic gain control (AGC) circuit used in the light detection section of FIG. 2.

The AGC circuit 28 is shown in FIG. 6. The purpose of the AGC circuit 28 is to provide amplitude regulated analog signals to the multi-bit digitizer 20 (FIG. 2). The AGC'd Butterworth filter stage 28 provides a range of gain, here approximately a maximum of 44 db to a minimum of 2.8 dB. With signal levels from the output of the differentiator circuit 24 ranging from 10 m$V_{p-p}$ to 1.6 $V_{p-p}$, the AGC'd Butterworth filter stage 26 provides a maximum signal magnitude for the signal on line 41 of 2.22 $V_{p-p}$ and a minimum signal of 1.66 $V_{p-p}$, for a maximum to minimum ratio of 1.4.

Figure 7:
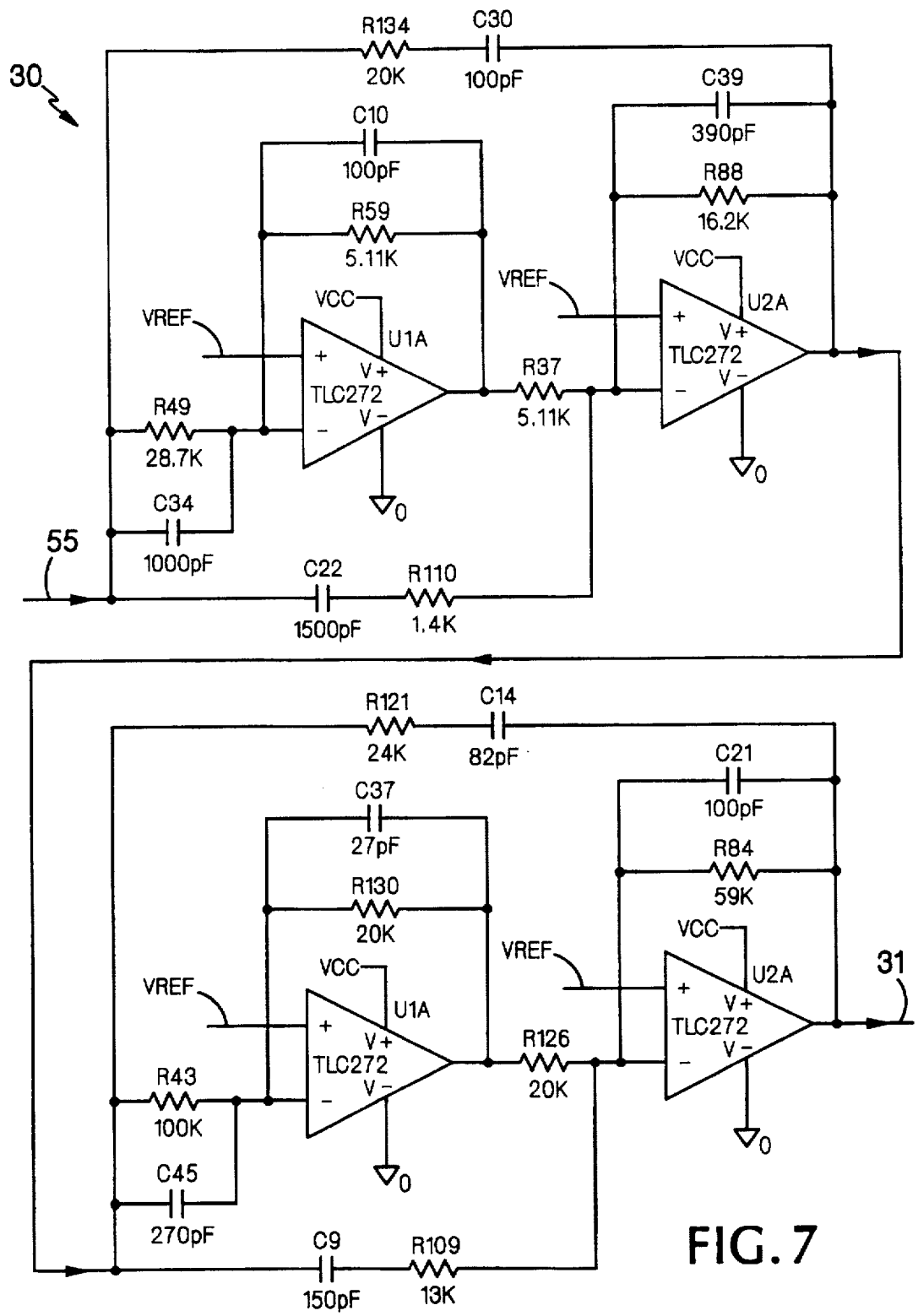
FIG. 7 is a schematic diagram of an enhancement filter used in the light detection section of FIG. 2.

The enhancement filter 30 is shown in FIG. 7. The purpose for the enhancement filter 30 is to correct for convolution distortion by enhancing, or amplifying, the high frequency content of the analog signal fed thereto while maintaining linear phase. More particularly, the enhancement filter 30 corrects for some of the convolution distortion realized when the spot size of the laser beam 13 (FIG. 1) is significantly larger than the narrowest symbol element (i.e., a bar 14b or a space 14s) in the bar code 14. As the face of the laser beam 13 moves outward from the bar code 14, a typical beam profile in the x-direction (FIG. 1) starts out wide, grows narrow until a minimum is reached at the waist, and then grows larger at farther ranges. Convolution distortion is most prominent when high density symbols are placed close to the scanner 12 where the spot size is large, or symbols placed far into the range of scanner 12 where the spot size also becomes large. More particularly, in bar code laser scanning one of the factors limiting the working range of the scanner is the filtering effect of the optical beam on the original bi-level (i.e., bar-space) bar code signal. The purpose of an analog edge enhancement filter 30 is to compensate for the effect of the finite width of the optical beam. This effectively gives the scanner higher resolution.

Figure 9A:
FIGS. 9A and 9B are timing histories of signals produced by the scanner of FIG. 1 prior to passing through the enhancement filter of FIG. 7, the timing history of FIGS. 9A and 9B being for a scanning spot size larger than the scanning spot size used for FIGS. 8A and 8B.

The optical spot of the laser acts as a low pass filter on the original bar code signal 32 (FIG. 3A) produced by the detector 22. This results in a smoothing of the edges of the signal. If the spot size is larger than the smallest element of the bar code (i.e. a unit module; bar or space) then not only are the edges smoothed but the height of the edges decreases. This can be seen by looking at the signal in FIGS. 8A and 9B, where FIG. 8A is the output signal 32' of detector 22 for a spot size of 2.0 modules and FIG. 9A is the output signals 32" of detector 22 for a spot size of 2.8 modules.

Figure 9B:
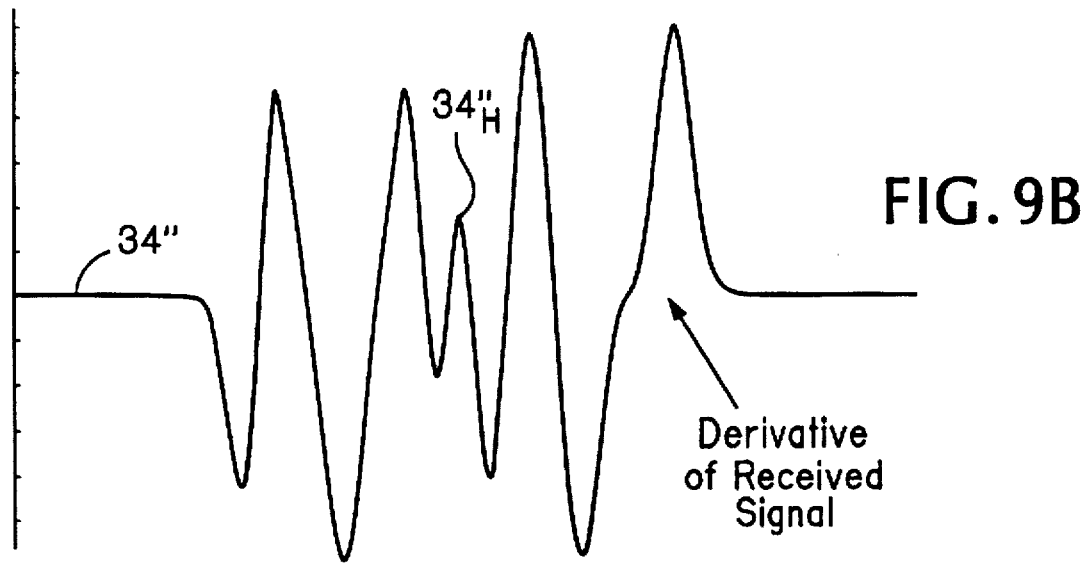
Figure 9C:
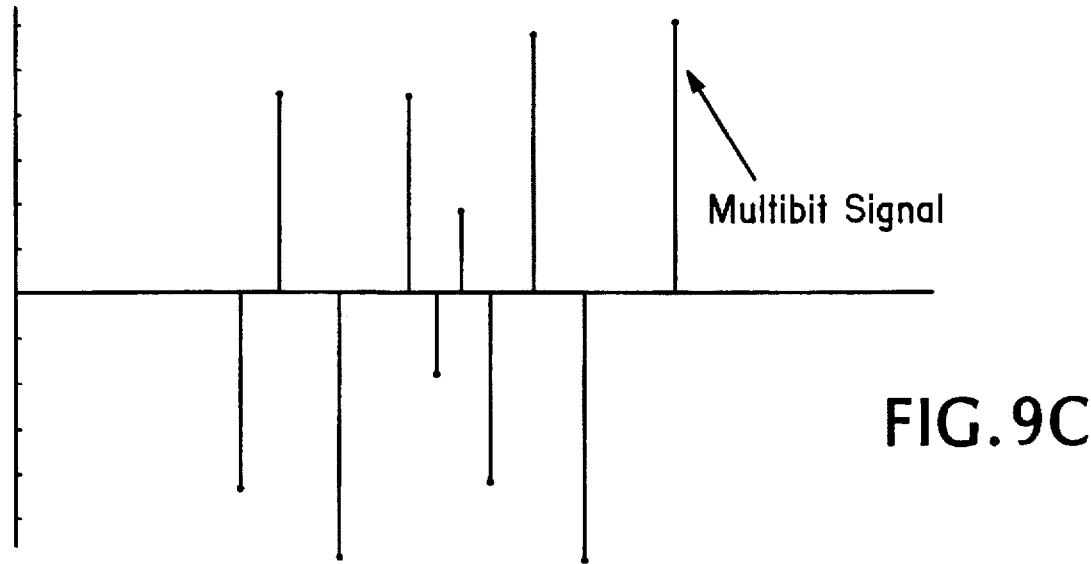
FIG. 9C showing the peaks in the signals produced in FIG. 9B.
Figure 10:
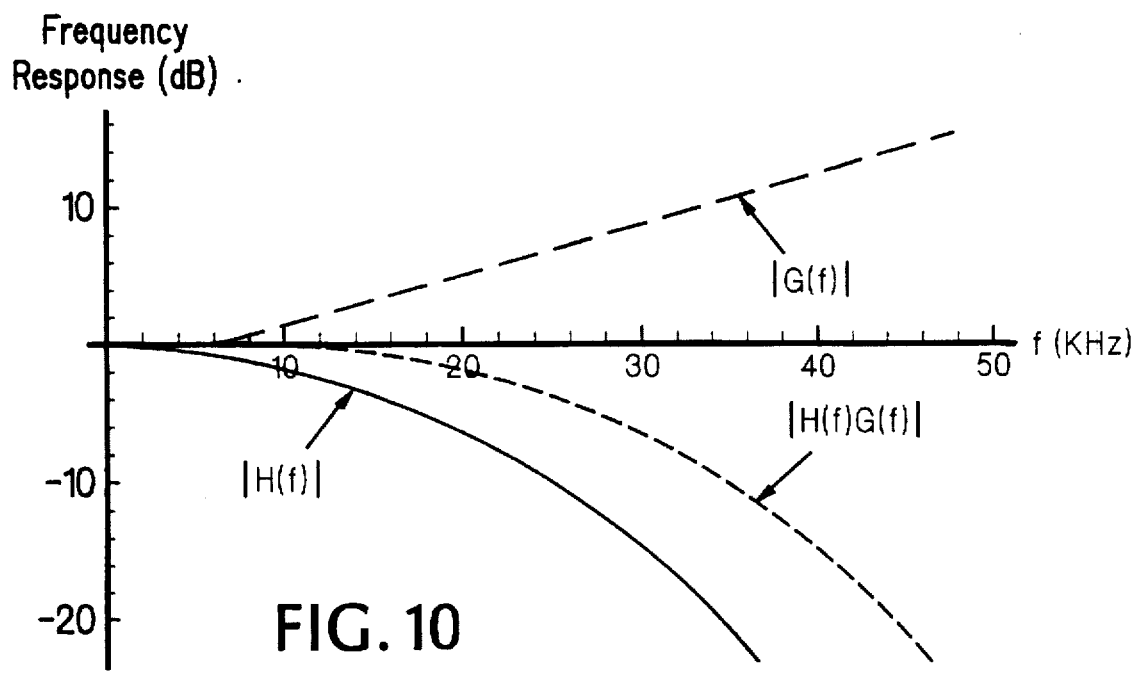
FIG. 10 shows the frequency response of the enhancement filter of FIG. 7.

Also, as the spot size gets larger, the actual edge locations shift. This is often referred to as convolution distortion. Excessive convolution distortion can prevent decodability of the bar code. If one compares the first derivative signals for a large spot (2.0 modules as shown in FIG. 9A with 2.8 modules as shown in FIG. 9B) the height of the peaks of the first derivative signal 34H" decreases for some of the edges as for example is evident when peak 34H" in FIG. 9B is compared with the same corresponding peak 34' in FIG. 9A. If these peak values drop below a fixed threshold (usually about 20% of the maximum) then a threshold circuit 202 (FIG. 2, to be described) will not accept them. If the edges are smaller than the threshold, or if the edges shift too much, then the bar code is undecodable. The purpose of the enhancement filter 30 is to enhance the edge strengths (i.e., the peaks $34_1$-$34_{10}$, in the signal produced by the differentiator circuit 34 before being passed to the multi-bit digitizer 20 so that the valid edges will exceed the threshold as well as be close enough to the proper location so that the bar code is decodable. The peaks in the signals shown in FIGS. 8B and 9B are shown in FIGS. 8C and 9C, respectively.

The spot size of the laser is a physical length measured in microns or mils. However, since the laser beam is scanning the spot size can be thought of as having a size (or time duration) in seconds. The time duration of the spot is the physical size (say in inches) divided by the velocity (say in inches/second). It is convenient to think in the time domain since the received signal is a time domain signal and all subsequent processing (i.e. analog filtering, digitizing, etc.) is done in the time domain.

As noted above, the optical spot size changes with distance from the scanner. Past the waist of the beam the spot size grow approximately linearly with distance. The spot speed of the laser grows linearly as a function of distance from the scanner. Hence, past the waist of the beam the spot duration, in seconds, is approximately fixed. This makes it easier to design an edge enhancement filter 30 since in the time domain the low pass filter that operates on the bar code signal (i.e. the laser beam) is approximately a fixed filter. Since the optical beam is Gaussian the impulse response of the low pass filter is Gaussian, $$h(t) = \frac{1}{\sqrt{2\Pi\sigma^2}} e^{-\frac{t^2}{2\sigma^2}}$$

where the spot size in the time domain is 4 σ. The Laplace Transform of this impulse response is, $$H(s) = e^{\frac{s^2\sigma^2}{2}}$$

Edge enhancement filter 30 is to implemented to an approximate inverse filter of H(s) using a Taylor series approximation:

$$G(s) = \frac{N(s)}{\Delta(s)}$$

$$N(s) = 1 - \frac{S_2\sigma_2}{2} \approx H^{-1}(s)$$

The demoninator, $\Delta(s)$, gives the pole locations which are usually some standard low pass filter poles (e.g. Butterworth, Bessel). These poles art placed at higher frequencies than the zeros, so to prevent too large a gain at high frequencies that would just increase noise.

FIG. 9 shows the transfer function H(f) due to the optical spot, the transfer function G(f) due to the edge enhancement filter, and the transfer function of the combination H(f)G(f). Note that the bandwidth of the combined system is widened.

The effect of the edge enhancement filter 30 is to improve the working range of the scanner 12. At distances where the spot size of the laser beam 13 is so large that the strength of the edges are less than the threshold in the multi-bit digitizer 20, or the edges have shifted too much, the bar code is undecodable. As noted above, the edge enhancement filter 30 enhances the edges of the signal so that they will exceed the threshold and be closer to the proper location and the bar code is decodable. FIGS. 24 and 25 show signals produced when scanning a high density bar code (e.g. 3.5 mil) several inches from the noise of a standard range scanner. FIG. 24 shows the signal produced by the differentiator circuit 24 and FIG. 25 shows the same signal after passing through the enhancement filter 30. It is noted that the edges of the enhanced signal produced by enhancement filter 30 are much more pronounced and it is much easier to digitize and decode such an enhanced signal.

Figure 11:
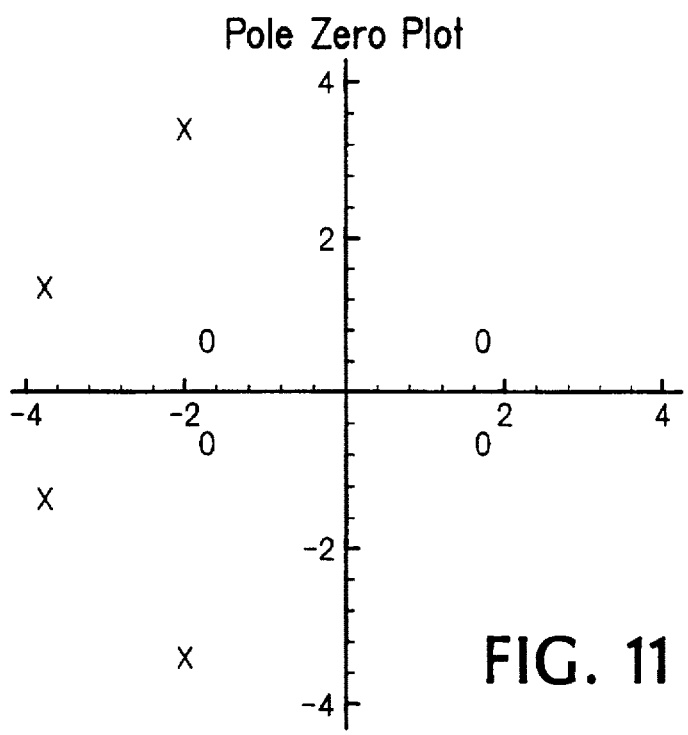
FIG. 11 shows the locations of the poles and zeros of the enhancement filter of FIG. 7.

Referring now to FIG. 11, the enhancement filter 30 includes four modified Butterworth poles, and two complex conjugate pairs of zeros (one pair of complex conjugate zeros to the right of the imaginary axis, the other pair to the left) arranged it such an order to provide linear phase over the 'enhanced' frequencies of interest.

Referring now in more detail to the timing generation circuit 42 (FIG. 2), such circuit 42 includes: a full wave rectifier circuit (FWR) 200 for converting the bipolar signal on line 41 into a corresponding unipolar electrical signal on line 201. The threshold circuit 202 is fed by the unipolar signal on line 201 and by a reference potential produced by the threshold circuit 202 itself to represent a predetermined percentage, here 80% of a peak level in the unipolar signal. The threshold circuit 202 produces a logic signal on line 204 related to the difference between the level of the unipolar signal on line 201 and the reference potential. The timing generation circuit 42 includes the edge detector circuit 206 (FIG. 14) fed by the unipolar signal on line 201 for high pass filtering of the unipolar signal on line 201 and for producing a logic signal on line 208. The logic signal on line 208 changes logic state when the unipolar signal on line 201 is at its minimum or maximum value. The timing generation circuit 42 includes a timing control logic circuit 210, fed by the edge detector circuit 206, the threshold detector circuit 202 (FIG. 15) and the margin detection circuit 40, for producing the edge strength timing pulse signals on line 17. The edge strength pulse commences when a peak in the unipolar signal on line 201 above the threshold level established by the threshold detector 202 is detected and continues for a period of time related to the magnitude of the peak of the unipolar signal, i.e., the peak level of the unipolar signal pulse. The polarity generation circuit 44 is responsive to the electrical signal produced by the differentiator circuit 24 (or after modification, if any, by the enhancement filter 30), the electrical signal produced by the margin detection circuit 40, the edge strength timing pulse signal on line 17, and a reference signal on line 212 representative of the average level of the electrical signal produced by the differentiator circuit 24 and, when "in", enhancement filter 30, for producing a logic signal on line 19 having a first logic state signal when the electrical signal produced by the differentiator circuit 22 and, when "in", enhancement filter 30 is greater than the reference signal on line 212 and a second logic state when the electrical signal produced by the differentiator circuit 24 and, when "in", enhancement filter 30 is less than the reference signal on line 212.

Figure 12:
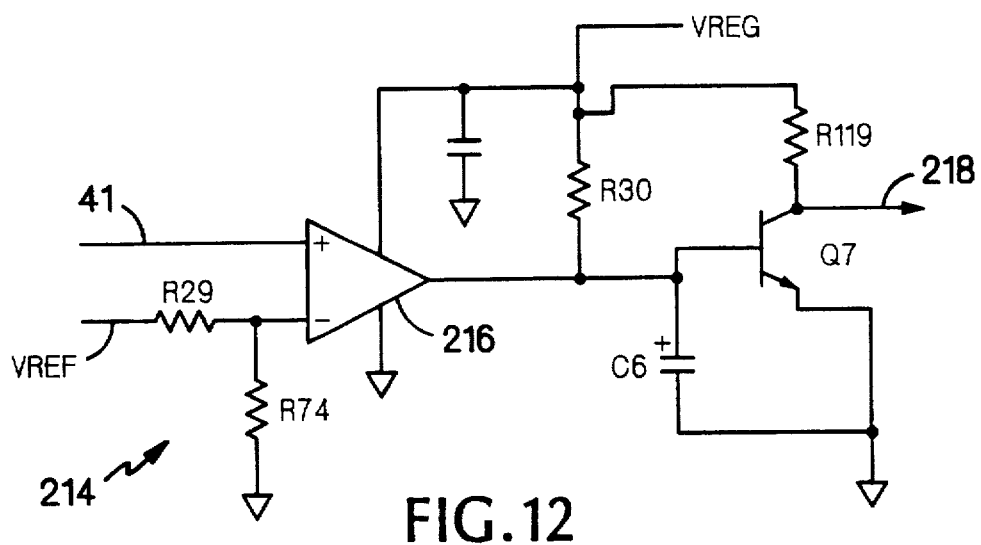
FIG. 12 is a schematic diagram of a margin detection circuit used in the multi-bit digitizer of FIG. 2.

Margin detection circuit 40 (FIG. 12) detects the presence of a bar code and enables timing and polarity signals to be produced on line 17, 19, respectively. Margin detection circuit 40 includes a resistor voltage divider network 214 (R29, R74) fed by a reference voltage VREF, here 1.9 volts. The voltage produced by the network 214 is compared to the enhanced differentiated analog signal produced by the signal on line 41. When the first negative going bar edge (i.e., as the signal 34, FIG. 3A, goes from $32H_1$ to $32I_1$), comparator 216 (FIG. 12) produces a relatively low voltage. This low voltage turns "off" transistor Q7, and raises the level of the voltage on the collector electrode thereof (i.e., line 218) to a supply voltage, VREG, through a resistor R119. This in turn allows the timing pulse and polarity signals to be produced on lines 17, 19. After the bar code is no longer present, i.e, the signal 34 (FIG. 3A) reaches a high steady state level, i.e., $32H_6$, the comparator 216 becomes an open circuit at its output. In such condition, capacitor C6 start charging to VREG through resistor R30. When the voltage on capacitor C6 voltage reaches 0.7 $volt_s$, the transistor Q7 saturates pulling the collector electrode thereof, and hence line 218, to a "low" level. This prevents the timing pulse signal from being produce on line 17, and also sets logic level of the polarity signal on line 19 "high". As noted above, the multi-bit digitizer 20 produces the timing pulse signal on line 17 with the duration proportional to the height of the peaks of the enhanced, differentiated analog signal on line 41. The rising edge of the pulse occurs at the peak of the enhanced, differentiated analog signal on line 41 of the above described threshold conditions are met.

Figure 13:
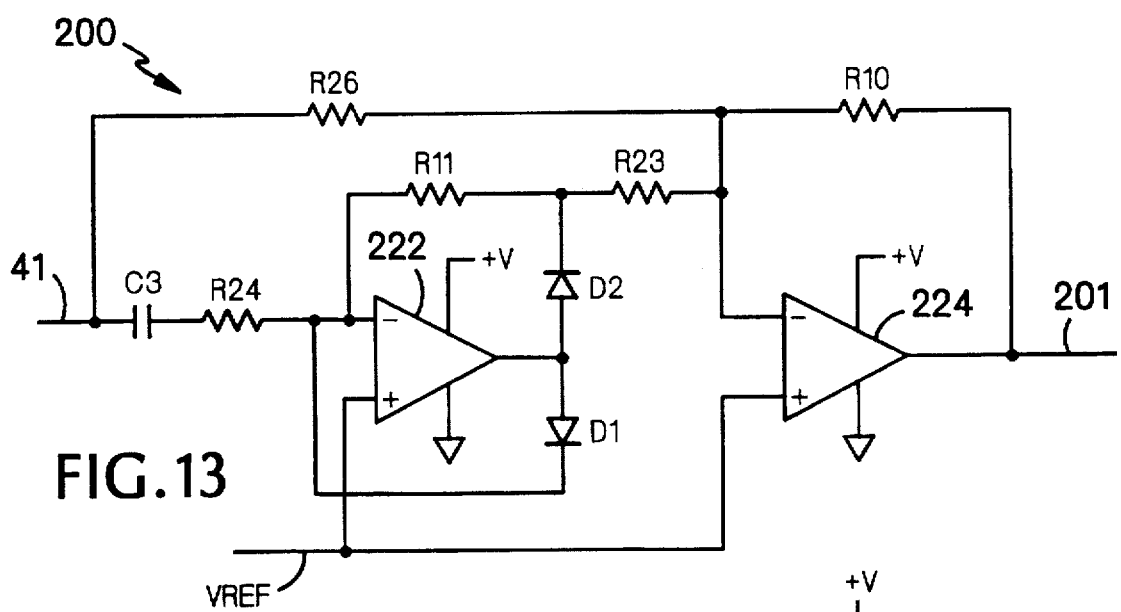
FIG. 13 is a schematic diagram of a full wave rectifier circuit used in the multi-bit digitizer of FIG. 2.

Referring now to FIG. 13, the FWR 200 includes capacitor C3, resistors R24, R11, R23, R10, R26, a pair of diodes D1, D2, and operational amplifiers 222, 224, all arranged as shown. The function of the FWR 200 is as follows: When the enhanced, differentiated analog signal on line 41, (Vin) goes below the reference voltage VREF, diode D1 is forward biased and diode D2 is reversed biased. This sets the voltage at the anode of diode D2 at the reference voltage VREF. The voltage at the output 220 of the FWR 202, i.e., Vout=–(VREF+Vin) (R10/R26–VREF(R10/R23)+VFER(1+R10/(R26||R23)); where "||" is the resistance of the (R26)(R23)/(R26+R23); i.e, the resistance of the parallel combination of resistors R26, R23. Therefore, Vout=VREF–Vin. On the other hand, when Vin swings above VREF, D1 is reversed biased and D2 is forward biased. This sets the voltage at the anode of D2 equal to –Vin+VREF. In this case the output on line 201 of the FWR 200 will equal to: Vout=–(VREF+Vin)(R10/R26)–(–Vin+VREF)(R10/R23)+VREF(1+R10/(R26||R23)). Therefore , Vout=VREF+Vin. Therefore, the output of the FWR 200 is a unipolar signal relative to the reference voltage, VREF.

Figure 14:
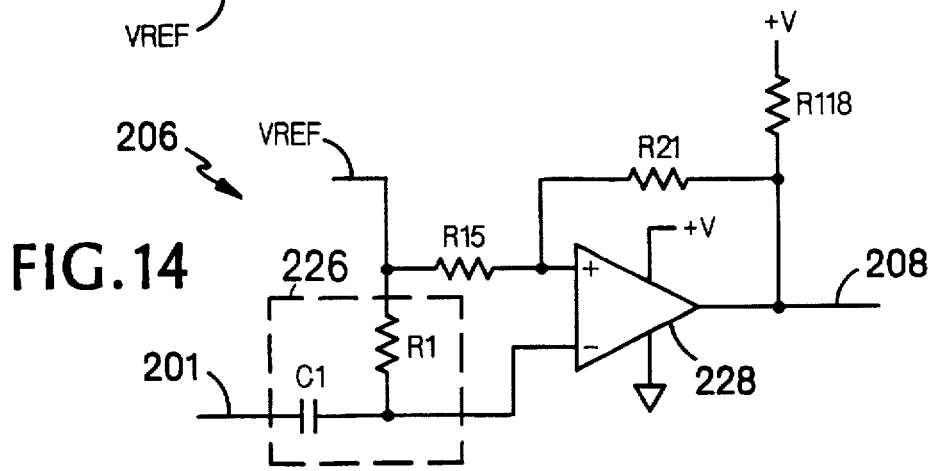
FIG. 14 is a schematic diagram of an edge detection circuit used in the multi-bit digitizer of FIG. 2.

Referring now to FIG. 14, the edge detection circuit 206, as shown. It is first noted that the function of the edge detect circuit 206 is to locate the edges of the enhanced, differentiated analog signal on line 41 which should correlate to the bar/space edges 14s (FIG. 1) of the bar code 14. The full waive rectified, enhanced differentiated analog signal on line 201 is fed, through an R-C network 226 made up of a capacitor C1, here 1000 pF and resistor R1, here 1.8 kohms for filtering. The RC combination, i.e., network 226, acts as a passive differentiator stage with the result that the peaks (maximums) of the signal on line 201 from FWR 200 get mapped into zeros, i.e. signals having levels at VREF. This filtered signal is compared to VREF (1.9 volts) in comparator 228. When the peaks in the differentiated signal produced by the network 226 are greater than VREF, comparator 228 is triggered and produces a high voltage on output 208. Resistors R118, R15 and R21 generate hysteresis which prevents the comparator 228 from switching on noise. The comparator 228 output 208 switches to a high level every time the differentiated signal produced by network 226 peak is detected.

Figure 15:
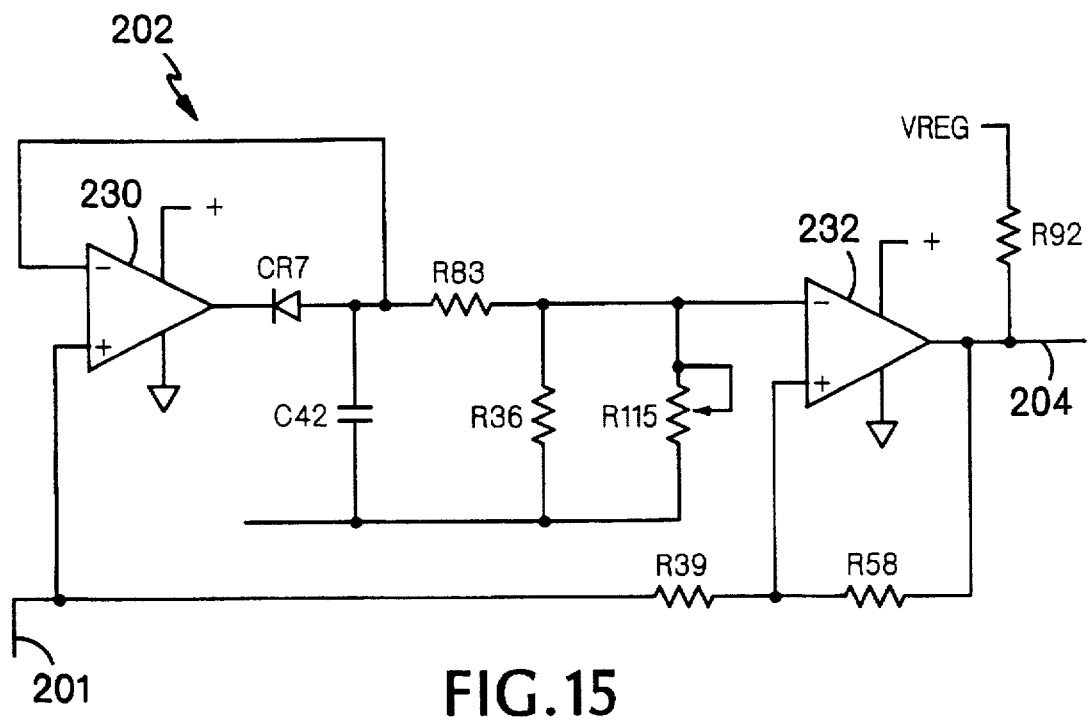
FIG. 15 is a schematic diagram of a threshold detection circuit used in the multi-bit digitizer of FIG. 2.

Referring now to FIG. 15, the threshold circuit 202 is shown. The function of the threshold circuit 202 is to monitor the level of the FWR signal produced on line 201 and switch the output 204 of the threshold circuit 202 to a high level when the level of the signal from FWR 200 (i.e., the level of the signal on line 201) gets above some percentage, here, 80% of the peak voltage level on line 201. Comparator 230, diode CR7 and capacitor C42 form a positive peak detector. The charge time of capacitor C42 is controlled by the output impedance of comparator 230 in series with the dynamic resistance of diode CR7. The discharge time of capacitor C42 is controlled by resistor R83 in series with the parallel combination of resistors R115, R36, as shown. The voltage fed to the inverting input (–) of comparator 232 is, therefore, a percentage of the peak voltage on capacitor C42; more particularly, the voltage on the input inverting input (–) of comparator 232 is equal to Vcap(R36/(R36+R83||R115)); where Vcap is the voltage on capacitor C42 and R83||R115 is (R115)(R36)/(R115+R36). The voltage on the input inverting input (–) of comparator 232 is compared to the FWR voltage produced on line 201. The voltage on line 201 is fed to the non-inverting (–) input of comparator 232 through resistors R39, as shown. When the FWR voltage on line 201 is above the voltage at the inverting input (–) of comparator 232, the comparator 232 output 204 goes to a high level, here VREG. Resistors R39, R118, and R92 provide hysteresis and pull up the output of the comparator 232 to its supply voltage VREG.

Figure 16:
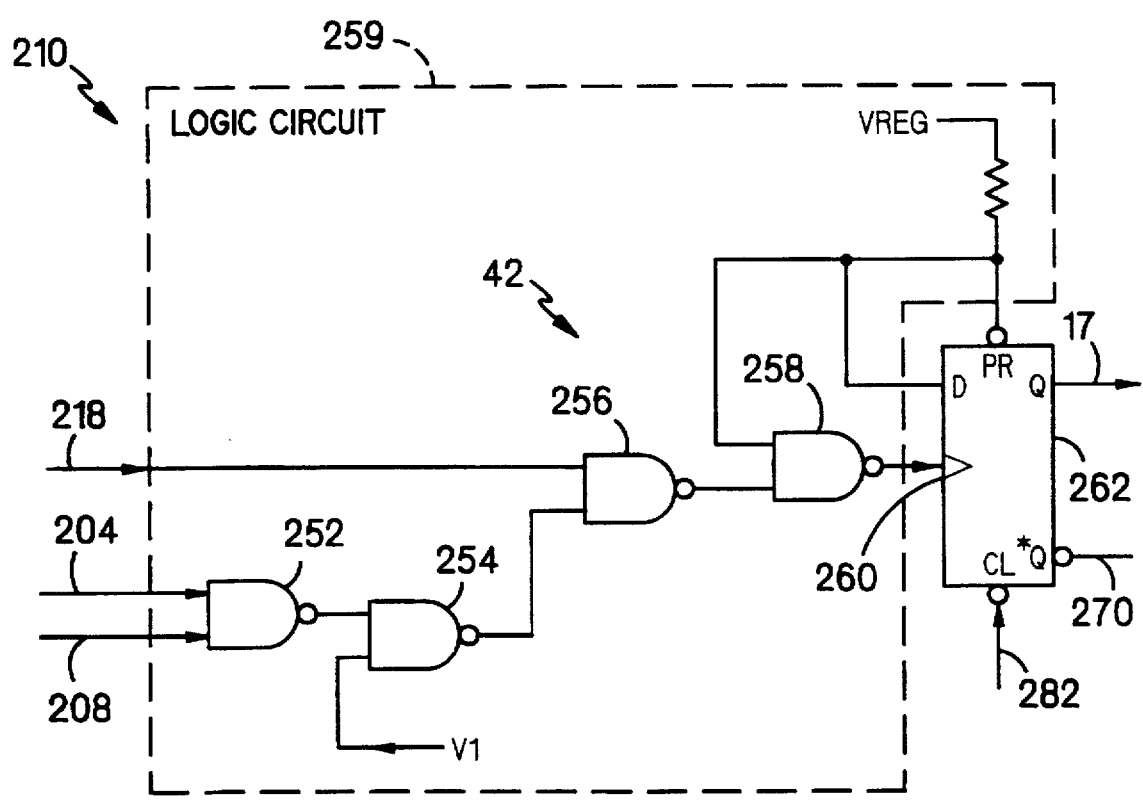
FIG. 16 is a schematic diagram of a timing control logic circuit used in the multi-bit digitizer of FIG. 2.

Referring again briefly to FIG. 2, the timing generation circuit 42 also includes a timing control and logic circuit 210 (FIG. 16) and an A/D converter circuit 250 (FIG. 17). The timing control and logic circuit 210 produces a positive going pulse on line 17 at the peaks produced by the FWR 200 on line 201. Referring now to FIG. 16, the timing control logic circuit 210 is shown to include four NAND gates 252, 254, 256 and 258 arranged as shown and configured to be logically equivalent to a single triple input AND gate section 259. The inputs to the logic circuit 259 are the outputs of margin detection circuit 40 (i.e., line 218), edge detection circuit 208 (i.e., line 208), and threshold detection circuit 202 (i.e., line 204). Lines 204, 208 are fed as inputs to NAND gate 252, the output of which, along with a fixed logic voltage V1, is fed to NAND gate 254, the output of which, along with line 218 is fed to NAND gate 256, as shown. The output of logic circuit 259 provides a signal for clock terminal 260 of a D flip-flop 262. Thus, when three conditions are met; (1) a margin, or bar code pattern is detected by margin detection circuit 40 (line 218); (2) an edge detected by the edge detection circuit 206 (line 208); and (3) the threshold requirement established by threshold detector 202 is met (line 204), a clock signal is fed to terminal 260 to clock in a high signal fed to the "D" input terminal of flip/flop 262, thereby producing a high level at the Q output of flip/flop 262, such Q output being fed to line 17. Thus, when the three conditions are satisfied, the edge strength pulse is commenced on line 17. Also, as output Q goes high, the complementary output Q* goes low. The low level signal on the complementary output Q* is fed, via line 270 to the A/D converter 250 (FIGS. 2 and 17).

More particularly, the Q* output is fed, via line 270 to pins E3 and E4 of an analog switch 272, here a model HC 4066. The A/D converter circuit 250 is enabled when the complementary output Q* goes low. Prior to that event, Q* is high. A high level on pins E3 and E4 of analog switch 272 forces the closure of the analog switch and connects input pin A3 to output pin B3 and connects input pin A4 to output pin B4. Pin A4 is the output of FWR 200 via line 201. Output pin B3 is connected to a resistor-capacitor network 273 made up of capacitor C5, a high input impedance buffer amplifier 275 and resistor R82, as shown. While pins A3 and B3 are connected, capacitor C5 acts as a sampling capacitor, and the signal at input pin A3 (i.e., the output of FWR 200) is fed through the resistor-capacitor network 273 to the non-inverting input of comparator 274, as shown. Resistor R32, capacitor C24, and comparator 276 are arranged as shown to form an integrator 277. As long as input pin A4 is connected to output pin B4, the integrator 277 is disabled, and VREF, fed to the non-inverting input (+) of comparator 276, appears at the output of comparator 276 (i.e., on line 278) and therefore at the inverting input (−) of comparator 274. When the level of the signal produced at the output of FWR 200 (on line 201) at non-inverting input (+) of comparator 274 is greater than VREF on line 278, the comparator 274 is at a high level. The output of comparator 274 is fed, via line 282, to the clear input of D flip/flop 262 (FIG. 16). (It should be noted that switch 57 may be implemented with the upper portion of switch 272. More particularly, terminal $57_1$ may be connected to terminal $A_1$, terminal $57_2$ may be connected to terminal $A_2$ and terminal $B_1$ (here connected in common with $B_2$) may provide line 41).

When a peak in the signal produced at the output of FWR 200 (line 201) is detected (and the three conditions described above are met), the complementary signal Q* (line 270) goes low. Therefore, the signal at pins E3 and E4 of analog switch 271 go low disconnecting input pin A3 from output pin B4 and disconnecting input pin A4 from output pin B4. At this point the voltage on capacitor C5 (FIG. 17) is being held at it's peak value, and the integrator 277 is enabled. The output voltage, vout, produced by integrator 277 on line 278 will be a ramp. The exact voltage formula is as follows:

$$vout=(1/C24)(\int ARCREF2/R32)dt+ARCREF2)$$

When the ramp voltage on line 278 becomes greater than the peak voltage on the non-inverting (+) input of comparator 274, the comparator 274 switches from its high level to its low level and, via line 282, clears the D flip/flop 262 (FIG. 16); i.e., the Q terminal goes low terminating the timing pulse signal on line 17. Further, the Q* terminal goes high. At this point the integrator 277 is again disabled. Resistors R82, R40, and R114 provide Hysteresis and pull up to VREG.

Therefore, in summary, the output terminal Q of the D flip/flop 262 produces the timing pulse signal for decoder 21 (FIG. 1). It gets set by the clocking at the peaks of the signal produced by FWR 200 and reset by the clear signal for the D flip/flop 262 on line 282 from the A/D converter 250 (FIG. 17). The time during which the Q terminal of the D flip/flop remains at a high level is proportional to the amplitude of the peaks of the signal produced by FWR 200 on line 201.

Referring now to FIG. 18, the polarity generation circuit 44 is shown. The polarity signal produced by such circuit 44 on line 19 represents the polarity of differentiated analog signal on line 41 at it's peaks. The differentiated analog signal on line 41 is compared to VREF (it's ac ground) on line 212 in comparator 290. If the signal on line 41 is above the reference VREF, the output of comparator 290 is at a low level. On the other hand, if the signal on line 41 is below the reference VREF, the output of comparator 290 is at a high level. This output acts as data line to a D flip/flop 272. Resistors R80, R98, and R60 provide hysteresis and pull up to VREG, as shown. The data at the D terminal of the D flip/flop 272 appears as the polarity signal on line 19 at the rising edge of timing pulse signal on line 17. (The signal on line 17 is fed to the clock terminal, CK, of D flip/flop 272, as shown).

In order to decode a multi-bit signal (based on a combination of the described timing pulse signal on line 17 and the polarity signal on line 19), it is first necessary to convert the signals on lines 17 and 19 into digital values representing the edge locations and strengths. Briefly, the decoder 21 includes two counters; a 16-bit counter 302 to measure bar code edge-to-edge times, $t_e$ (FIG. 1), from the edge strength or timing pulse signal on line 17 and an 8-bit counter 300 to the magnitude of the strength signal (i.e., the time duration $t_s$) from the signal strength timing pulse signal on line 17. The clock rate of the counter 300 is faster than the clock rate for counter 300, here by a factor of 5. At each bar code edge the decoder 21 reads the two counter values, resets the counters, and stores the values in memory 304 along with the polarity bit of the polarity signal on line 19. The polarity is tested and if it is positive then the strength value is stored directly. If it is negative the decoder stores a negative strength. Once a scan of multi-bit data has been stored it must be decoded. As shown in the timing histories for the example in FIG. 1, the middle two timing pulse $P_1$, $P_2$ signals have the same polarity, as when there are two negative edges in a row.

Figure 19:
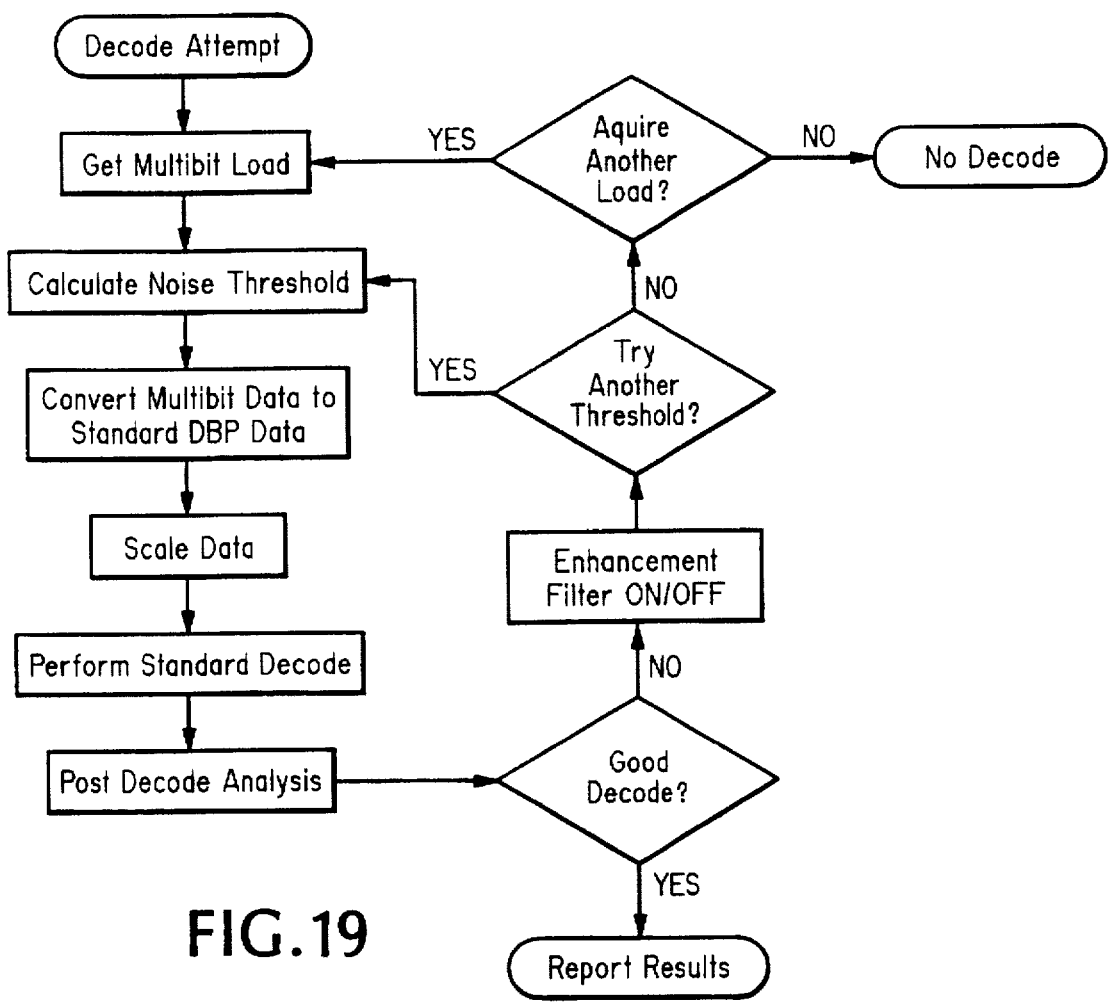
FIG. 19 is a flow diagram showing the operation of a decoder used in the processor of FIG. 1.

The decode algorithm, preformed by CPU 306, can be viewed as a pre-process and post-process. FIG. 19 shows a flow chart of the decode algorithm. The pre-process involves first analyzing the edge strength timing pulse signals to determine edge strength, choosing a noise threshold to separate real and false edges, and then converting the data to a standard DBP format. After a standard decode attempt has been performed on the converted DBP data, the post-process analyzes the decode results and initiates appropriate actions. If a full decode occurred, the post decode analysis will decide whether to accept this decode based on certain security checks. The post-process will also decide whether to attempt a second decode on the same data and whether to place the enhancement filter 30 "in" or "out".

Figure 20:
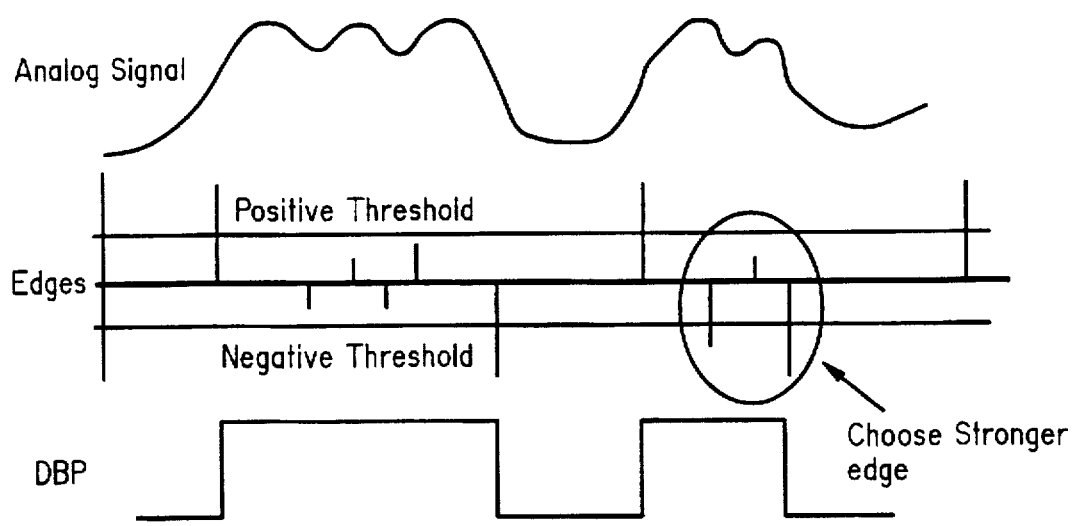
FIG. 20 is a timing diagram useful in understanding the decoder.
Figure 21:
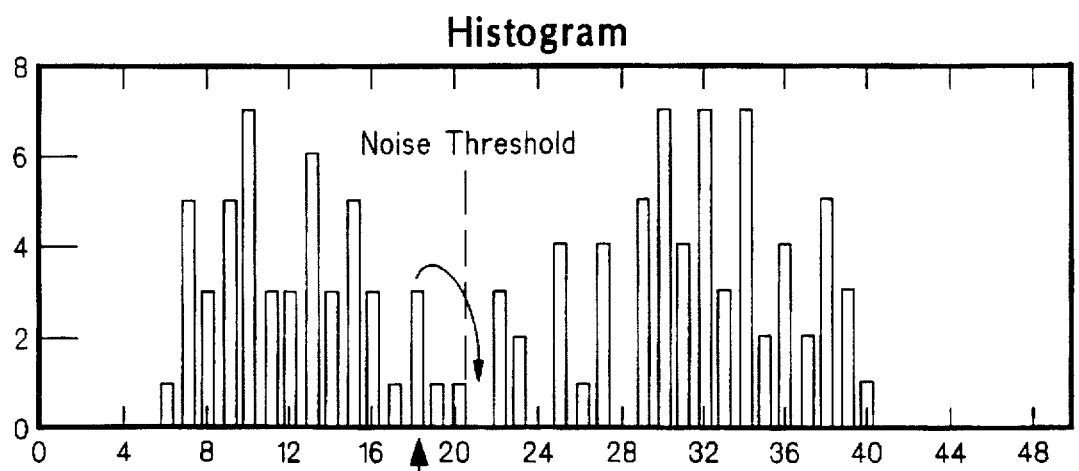
FIG. 21 is an unsmoothed histogram used by the decoder in establishing a noise threshold level for the decoder.
Figure 22:
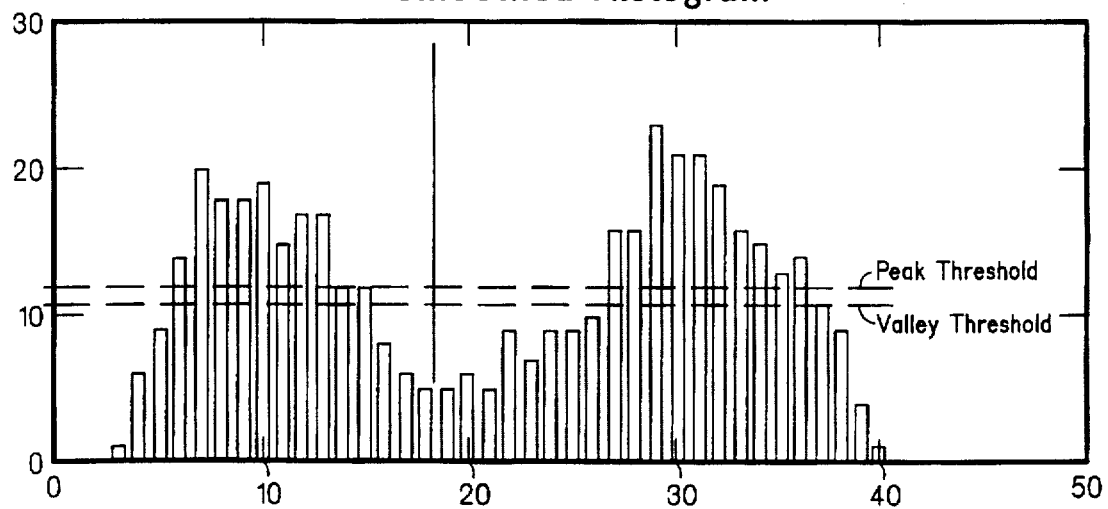
FIG. 22 is an unsmoothed histogram, constructed from the unsmoothed histogram of FIG. 21 and used by the decoder in establishing a noise threshold level for the decoder.

The process of converting the Multibit data to DBP is shown in FIG. 20. The edge strengths are depicted as vertical lines whose height and direction represent strength and polarity. There are two rules used in the converting process. First, all edges that are below the noise threshold are ignored. Second, if there are multiple edges of the same polarity above the noise threshold, the stronger edge is chosen. The single decode attempt processing steps are described below:

(1) A complete scan of data is acquired through the Timing, Polarity, and start of scan (SOS) signals (FIG. 1) and loaded into memory 304. The data consists of a sequence of edges (positive or negative) and edge strengths;

(2) After the data is acquired, histograms (FIGS. 21 and 22, to be described in detail herein after) are constructed using the magnitude of the edge strengths. The histograms' peaks and valleys are analyzed and stored as histogram features. Valleys in the histograms represent possible conversion thresholds. Edges whose strengths are below the conversion threshold are considered noise and are ignored; and, (3) Once a conversion threshold is chosen, the data is converted to a standard DBP format. During the conversion, the number of edge strength signals ignored is counted to indicate the amount of noise present in the bar code signal. This noise measure is used by the post decode analysis;

(4) To achieve a large dynamic range, the time between edges, $t_e$, are measured using 16 bit timers. After the multibit data is converted into a standard DBP format, the 16 bit data is scaled down to 8 bits. The amount of scaling is chosen based on the center ten elements of the DBP data;

(5) After the Multibit data has been converted into a standard DBP format, it is processed by the standard 8-bit decode algorithms. The standard decode algorithms are slightly modified in order to return detailed information about a failed decode attempt (eg. how many characters were decoded ?). This information is used by the post decode analysis;

(6) After a standard decode attempt, the post decode analysis examines the decode results, the noise measure, and the histogram features and initiates appropriate actions. If a full decode occurred, the post process will decide whether to accept this decode based on the decoded message and the noise measure (number of edges ignored). For example, "weak" code types such as Interleaved 2 of 5 may be rejected if a large amount noise is present. The post decode analysis will also decide whether to attempt a second decode on the same Multibit data and whether the enhancement filter should be turned "on" (i.e., "in") or "off" (i.e. "out").

A important aspect to decoding poorly printed bar codes using the edge strength timing pulse signals is determining which edges are 'real' as opposed to those which were caused by noise. To do this, histograms (FIG. 21) of the edge strengths are used. Typically, these histograms have two main peaks; one peak consisting of the weaker edges represents the noise, the other, consisting of the stronger edges, represent barcode. The lowest point in the valley between the two peaks is the noise threshold ( edges stronger than the threshold are considered real).

Finding this point consists of the following steps (FIG. 23):

(1) The edge strength histogram consists of a 128 byte array. Each element of this array represents a possible edge strength (0-127). The value of each element in the array represent the number of occurrences of edges having that strength. To create the histogram, the MultiBit load is traversed and, using each strength as an index into the array, the appropriate histogram location is incremented;

(2) The initial histogram (FIG. 21) tends to be very coarse in distribution, having many high peaks and deep valleys. This make it difficult for the software to determine which of these are the true peaks and valleys. To help solve this problem the histogram is smoothed (FIG. 22) using a rolling sum technique. In the smoothed histogram, each location represents the sum of four consecutive locations of the original histogram. Each consecutive sum in the smoothed histogram overlaps the previous sum by three locations of the original histogram. For example:

*smoothed_hist*[0]=*hist*[0]+*hist*[1]+*hist*[2]+*hist*[3]

*smoothed_hist*[0]=*hist*[1]+*hist*[2]+*hist*[3]+*hist*[4];

(3) Once the histogram is smoothed (FIG. 22), each peak and valley is identified. A peak is defined as any location whose immediate neighbors are smaller. Likewise, a valley is defined as any location whose immediate neighbors are larger. In cases where an immediate neighbor is equal, the nearest non-equal neighbor is used for the determination. When a peak or valley has a neighbor which is equal, the left-most location is selected;

(4) Although the histogram has been smoothed, it still has ripples in it. In order to determine which of the peaks and valleys found in the previous step are of interest, peak and valley thresholds are chosen. Only valleys that are below the valley threshold are considered. Likewise, only peaks which are above the peak threshold are considered. The peak threshold is determined by taking the average of all the peaks heights greater than 4, excluding the highest peak and the lowest peak (which is greater than 4). This vale is then biased by negative 2 to accept borderline peaks. If there are less than 5 peaks which are greater than 4, the threshold is set to the lowest peak which is greater than 4. If only there is only 1 peak greater than 4, the threshold is set to that value minus 1. Only those peaks which are greater than the threshold are considered in the following steps. The valley threshold is determined by taking the average of all the valley depths greater than 0, excluding the highest valley and the lowest valley (which is greater than 0). This value is then biased by positive 2 to accept borderline valleys. If there are less than 5 valleys which are greater than 0, the threshold is set to the highest valley which is greater than 0. If only there is only 1 valley greater than 0, the threshold is set to that value plus 1. Only those valleys which are less than the threshold are considered in the following steps. In cases where the peak threshold is less than the valley threshold, the following rule applies. If there were more peaks found than valleys, set the valley threshold qual to the peak threshold. Otherwise, if there were more valleys than peaks, then set the peak threshold equal to the valley threshold.

Now that all of the peaks and valleys have been identified, and peak and valley thresholds have been chosen, the noise threshold van be determined. Basically this is done by finding, in the smoothed histogram (FIG. 22), the deepest valley that is less than the valley threshold, which is between two peaks that are greater than the peak threshold. Occasionally, this method may fail to find a valley for several reasons; only 1 peak above the peak threshold, 1 no valleys below the valley thresholds between peaks above the peak threshold, no peaks or valleys that exceed their thresholds, etc. When this happens, the following method is used to pick a valley. If no there were no peaks above the peak threshold or, the first peak in the list exceeds the peak threshold, pick the first valley in the list regardless of whether its below the valley threshold. Otherwise, chose the deepest valley in the list that precedes the first peak that exceeds the peak threshold.

Regardless of the method used, once a valley has been selected from the smoothed histogram, the four locations in the original unsmoothed histogram which represent the selected point are examined. The lowest of the four locations is selected as the threshold. If more than one of those location shares the lowest value, the left-most location is selected. This value is then decremented so that strengths equal to the lowest point are accepted as real data during the conversion process.

Now that a noise threshold has been determined, the data can be converted to standard DBP format for decoding by the standard decode algorithms described in the above referenced patent applications, the subject matter of which is incorporated herein by reference). This is done by traversing the load and concantinating edges that do not exceed the noise threshold which fall between edges, of alternating polarity, that do. For example, referring to FIG. 26A, timing pulse signals 400, 402, 404, 406, 408, and 410 are shown having edge strength levels, 20, 18, 9, 11, 22, and 21, respectively, as indicated. The corresponding polarity signal is indicated in FIG. 26B. With a threshold level of 15, for example, timing pulse signals 404 and 406 do not exceeded such threshold level and therefore are considered as false edges (i.e., edges from noise). Thus, in the DBP conversion, the decoder ignores timing pulse 404, as indicted in FIG. 26C.

When more than one edge of the same polarity, that exceed the threshold level, are found before encountering a suitable edge of the opposite polarity, the strongest edge strength timing pulse signal is selected, as shown in FIGS. 27A–27C. There, for example, timing pulse signal 420, 422, 424, 426, 428, 430 and 432 are shown having edge strength levels 20, 16, 68, 18, 17, 23 and 19, respectively, as indicated, in FIG. 27A. Again, a threshold level is 15, for example. Thus, timing pulse signal 424 does not exceed the threshold level of 15, and is ignored, as described above. Further, in this example, two consecutive timing pulse signals, 428, 430 have the same edge polarity, as shown in FIG. 27B. Thus, the timing pulse signal having the strongest edge strength level, here timing pulse 430 is selected as the timing pulse to determine polarity (i.e., the converted DBP signal FIG. 27C) changes state in response to the stronger edges strength; i.e., timing pulse signal 430, as shown in FIG. 26C It should be noted that the edge enhancement filter 30 (FIG. 3) can be switched "in" or "out" under software control. When switched "in", this filter 30 increases the scanners ability to read high density symbols, as discussed above. However, with the filter 30 "in", the scanners ability to read poorly printed dot matrix symbols is reduced. Preferably, the edge enhancement filter 30 is switched "in" every third scan for the duration of one scan. This is done to ensure that the filter is active on alternating scan directions. In cases where multiple decodes are required, once a decode has occurred the filter will be left in the state it has in at the time of the initial decode.

Other embodiments are within the spirit and scope of the appended claims.

What is claimed is:

1. A method of processing an electrical signal representative of light reflected from an information symbol, wherein the symbol comprises regions of different light reflectivity, and wherein the electrical signal contains edges corresponding to boundaries between adjoining regions of the symbol, the method comprising:

processing the electrical signal to determine the times of occurrence of the edges;

processing the electrical signal to determine the strengths of the edges;

generating a first output signal for use by a multibit decoder, the first output signal comprising pulses, each corresponding to an edge, wherein the durations of the pulses of the first output signal contain information representative of the strengths of the edges of the electrical signal.

2. The method of claim 1 wherein the times of occurrence of the pulses of the first output signal are representative of the times of occurrence of the edges of the electrical signal.

3. The method of claim 1 further comprising processing the electrical signal to determine the polarities of the edges and providing a second output signal comprising information indicative of the polarities of the edges.

4. The method of claim 2 further comprising processing the electrical signal to determine the polarities of the edges and providing a second output signal comprising information indicative of the polarities of the edges.

5. The method of claim 1 wherein the processing to determine the strengths of the edges comprises determining a first derivative of the electrical signal.

6. The method of claim 5 wherein determining a first derivative comprises differentiating the electrical signal.

7. The method of claim 5 wherein the processing to determine the strengths of the edges comprises edge enhancement processing.

8. The method of claim 7 wherein the edge enhancement processing comprises filtering selected to compensate for low pass filtering caused by the finite width of the scanning light beam used in generating the electrical signal.

9. The method of claim 3 further comprising multibit decoding of the first and second output signals.

10. A system for processing an electrical signal representative of light reflected from an information symbol, wherein the symbol comprises regions of different light reflectivity, and wherein the electrical signal contains edges corresponding to boundaries between adjoining regions of the symbol, the system comprising:

circuitry for processing the electrical signal to determine the times of occurrence of the edges;

circuitry for processing the electrical signal to determine the strengths of the edges;

circuitry for generating a first output signal for use by a multibit decoder, the first output signal comprising pulses, each corresponding to an edge, wherein the durations of the pulses of the first output signal contain information representative of the strengths of the pulses of the electrical signal.

11. The system of claim 10 wherein the times of occurrence of the pulses of the first output signal are representative of the times of occurrence of the edges of the electrical signal.

12. The system of claim 10 further comprising circuitry for processing the electrical signal to determine the polarities of the edges and providing a second output signal comprising information indicative of the polarities of the edges.

13. The system of claim 11 further comprising circuitry for processing the electrical signal to determine the polarities of the edges and providing a second output signal comprising information indicative of the polarities of the edges.

14. The system of claim 12 wherein the processing to determine the strengths of the edges comprises determining a first derivative of the electrical signal.

15. The system of claim 14 wherein determining a first derivative comprises differentiating the electrical signal.

16. The system of claim 14 wherein the processing to determine the strengths of the edges comprises edge enhancement processing.

17. The system of claim 16 wherein the edge enhancement processing comprises filtering selected to compensate for low pass filtering caused by the finite width of the scanning light beam used in generating the electrical signal.

18. The system of claim 12 further comprising circuitry for multibit decoding of the first and second output signals.

* * * * *

UNITED STATES PATENT AND TRADEMARK OFFICE
CERTIFICATE OF CORRECTION

PATENT NO. : 5,734,152

DATED : March 31, 1998

INVENTOR(S) : David Goren, Stephen Shellhammer, Harry Kuchenbrod, Donna Pandolfo, Gary Serbin, Guy Cipriani, and Edward Barkan It is certified that error appears in the above-identified patent and that said Letters Patent is hereby corrected as shown below:

Cover page, [75] Inventors, "Ronlonkoma" should be --Ronkonkoma--.

Col. 3, line 14, "produce" should be --produced--.

Col. 3, line 50, "refections" should be --reflections--.

Col. 5, line 25, "to the whether" should be --to whether--.

Col. 5, line 39, "a" should be --as--.

Col. 5, line 47, "$volt_s$" should be --volts--.

Col. 6, line 12, "VFERF" should be --VREF--.

Col. 6, line 7, "an" should be --a--.

Col. 7, lines 7 and 8, "34H" should be --$34_H$--.

Col. 7, line 63, "art" should be --are--.

Col. 8, line 23, "is" should be --in--.

Col. 9, line 18, "$volt_s$" should be --volts--.

UNITED STATES PATENT AND TRADEMARK OFFICE
CERTIFICATE OF CORRECTION

PATENT NO. : 5,734,152
DATED : March 31, 1998
INVENTOR(S) : David Goren, Stephen Shellhammer, Harry Kuchenbrod, Donna Pandolfo, Gary Serbin, Guy Cipriani, and Edward Barkan It is certified that error appears in the above-identified patent and that said Letters Patent is hereby corrected as shown below:

Col. 9, line 21, "produce" should be --produced--.

Col. 14, line 6, "vale" should be --value--.

Col. 14, line 24, "qual" should be --equal--.

Col. 14, line 30, "van" should be --can--.

Col. 16, line 32, delete "pulses" and insert --edges--.

Signed and Sealed this

Twenty-fifth Day of May, 1999

Attest:

Q. TODD DICKINSON

*Attesting Officer*     Acting Commissioner of Patents and Trademarks